(12) United States Patent  (10) Patent No.: US 7,425,977 B2
Sakai  (45) Date of Patent: Sep. 16, 2008

(54) INTERACTIVE COMMUNICATION APPARATUS

(75) Inventor: Yakichiro Sakai, Tokyo (JP)

(73) Assignee: Yakichiro Sakai, Tokyo (JP)

( * ) Notice: Subject to any disclaimer, the term of this patent is extended or adjusted under 35 U.S.C. 154(b) by 765 days.

(21) Appl. No.: 10/914,204

(22) Filed: Aug. 10, 2004

(65) Prior Publication Data

US 2006/0033808 A1    Feb. 16, 2006

(51) Int. Cl.
*H04N 7/14*  (2006.01)
*G06F 3/00*  (2006.01)

(52) U.S. Cl. ............... 348/14.01; 348/14.03; 348/14.07

(58) Field of Classification Search ... 348/14.01–14.08, 348/14.09, 14.1, 14.11, 14.12, 14.13; 455/575.1, 455/575.3; 715/762; 379/433.13, 433.02, 379/433.03–433.06, 447
See application file for complete search history.

(56) References Cited

U.S. PATENT DOCUMENTS

| 5,793,415 | A  | * | 8/1998  | Gregory et al.  | ............ | 348/14.1 |
| 5,953,048 | A  | * | 9/1999  | Mikami et al.   | ............ | 348/14.01 |
| 6,590,604 | B1 | * | 7/2003  | Tucker et al.   | ............ | 348/14.13 |
| 6,691,843 | B2 | * | 2/2004  | Nykoluk et al.  | ............ | 190/127 |

FOREIGN PATENT DOCUMENTS

| JP | 3-108961 | | 5/1991 |
| JP | 404094270 A | * | 3/1992 |
| JP | 4-104649 | | 4/1992 |
| JP | 5-30502 | | 2/1993 |
| JP | 6-30404 | | 2/1994 |
| JP | 6-133937 | | 5/1994 |
| JP | 7-7560 | | 1/1995 |
| JP | 8-65649 | | 3/1996 |
| JP | 8-140073 | | 5/1996 |
| JP | 9-172623 | | 6/1997 |
| JP | 10-214305 | | 8/1998 |
| JP | 10-222581 | | 8/1998 |
| JP | 10-333926 | | 12/1998 |
| JP | 11-96169 | | 4/1999 |

(Continued)

OTHER PUBLICATIONS

Cohen et al.; Portable, Standalone Video Telephone system; Jul. 8, 1999; WO99/34600.*

(Continued)

*Primary Examiner*—Melur Ramakrishnaiah
(74) *Attorney, Agent, or Firm*—Staas & Halsey LLP

(57) ABSTRACT

An interactive communication apparatus easy for use with a function of TV phone for providing a user with useful audio/visual information. The interactive communication apparatus comprises a display device for providing a screen display of visual information, a camera for capturing images of the user to acquire internally captured image data; a data input device for allowing the user to input information, an audio device for inputting/outputting audio information from/to the user, a communication device for receiving externally captured image data and external information from outside, and for transmitting the internally captured image data and internal information including the inputted information and the audio information to outside, a PC unit including a CPU and a memory mounted on a mother board, and connected with the display device, the camera, the data input device, the audio device and the communication device, and a case housing the display device, the camera, the communication device and the PC unit.

19 Claims, 24 Drawing Sheets

FOREIGN PATENT DOCUMENTS

| | | |
|---|---|---|
| JP | 11-154035 | 6/1999 |
| JP | 11-308599 | 11/1999 |
| JP | 2000-32131 | 1/2000 |
| JP | 2000-32421 | 1/2000 |
| JP | 2001-36879 | 2/2001 |
| JP | 2001-103153 | 4/2001 |
| JP | 2001-177878 | 6/2001 |
| JP | 2001-189808 | 7/2001 |
| JP | 2001-203996 | 7/2001 |
| JP | 2001-338084 | 12/2001 |
| JP | 2001-346768 | 12/2001 |
| JP | 2002-117254 | 4/2002 |

OTHER PUBLICATIONS

Notification of Grounds for Rejection issued in corresponding Japanese Patent Application No. 2002-131802, mailed on Jul. 31, 2007.

* cited by examiner

FIG.34
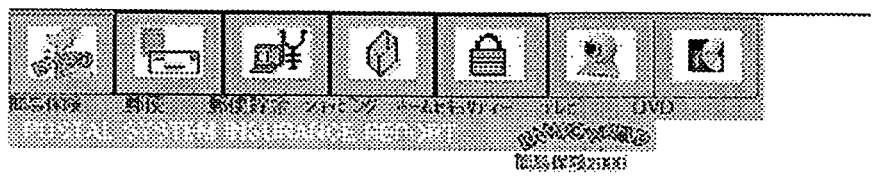
GUIDANCE
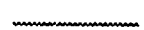
FIG.35
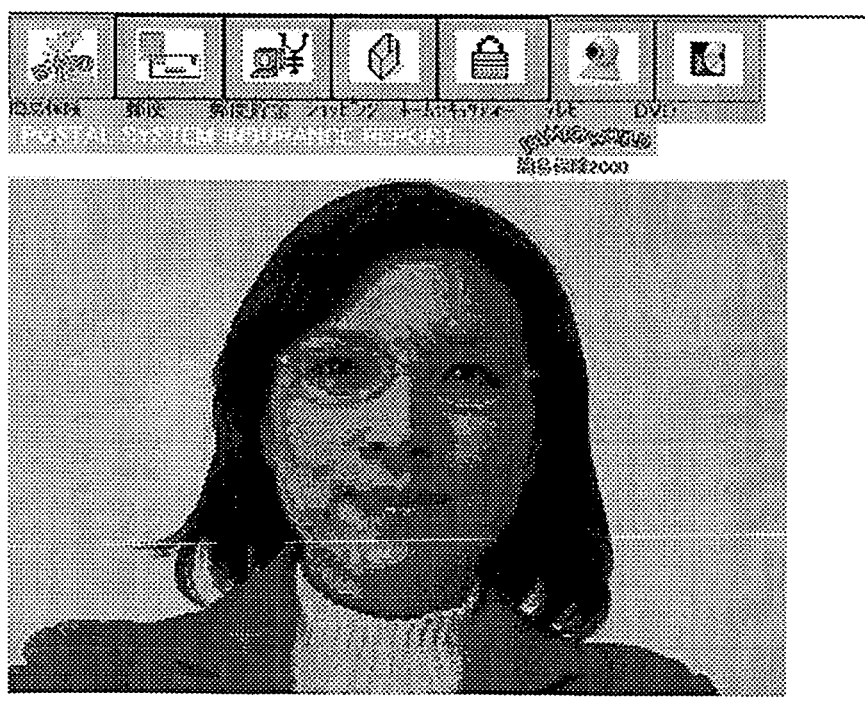

INTERACTIVE COMMUNICATION APPARATUS

BACKGROUND OF THE INVENTION

1. Field of the Invention

The present invention relates to an interactive communication apparatus suitable for home use.

2. Description of Related Art

With the spread of personal computers, the gap between people who know how to use computers and those who do not is widening. This widening gap might well be due to the fact that most personal computer applications, in an effort to improve performance, are equipped with so many functions, including those that novice users never learn to use, that they invite confusion in their operation.

Despite the expansion of opportunities to access the internet afforded by advances in broadband and other technologies, in which communication lines are always connected, since there is no personal computer available designed specifically to be usable by virtually anyone, there are people who have been left behind by advances in technology.

For example, attempts to achieve a combined TV phone, answering phone, home security system, shopping center, motion picture distribution and medical consultation center in a single integrated personal computer for home use requires selecting the necessary hardware and software and installing the hardware and the software.

Not only does such construction require specialized knowledge, but also, because post-installment operation differs depending on the individual hardware and software components, the resulting configuration lacks integration and is so complicated that the average user cannot hope to operate it.

In such a situation, mistakes in operation occur and people never learn to use some needed functions because the operation of such functions is too complicated.

Moreover, there is no effective combination of individual functions, and as a result it sometimes happens that it is impossible to acquire needed data smoothly.

SUMMARY OF THE INVENTION

The present invention provides an interactive communication apparatus that is easy to use and affords few mistakes in operation, and can obtain useful information using the most suitable selections.

An interactive communication apparatus of the present invention has a function of TV phone for providing a user with audio/visual information. The interactive communication apparatus comprises: a display device for providing a screen display of visual information; a camera for capturing images of the user to acquire internally captured image data; a data input device for allowing the user to input information; an audio device for inputting/outputting audio information from/to the user; a communication device for receiving externally captured image data and external information from outside, and for transmitting the internally captured image data and internal information including the inputted information and the audio information to outside; a PC unit including a CPU and a memory mounted on a mother board, and connected with said display device, said camera, said data input device, said audio device and said communication device; and a case housing said display device, said camera, said communication device and said PC unit.

The PC unit may include: means for displaying items of functions including the TV phone on the display screen for allowing a user to select one of the functions; means for acquiring external information relating to the selected function through said communication device, and displaying the acquired external information on the display device; means for displaying a plurality of options relating to the selected function as a list on the display screen for allowing the user to select one of the options; means for shifting to the function of TV phone when a function item of TV phone is selected in a state of performing the selected function other than the TV phone; and means for returning the screen display to the state immediately preceding the shifting to the function of TV phone when the function other than the TV phone is selected in performing the function of TV phone.

A required function can be selected with a single operation, and the necessary operations can be performed while viewing data relating to the selected function on the display device. Moreover, the user can switch to the TV phone function at will during operation of the selected function other than the TV phone function and obtain desired external data while confirming externally captured image data as necessary, as well as ask questions and confirm information by audio communication.

The functions other than the TV phone may comprise answering phone, facsimile, E-mail, internet access, home shopping, home security, movie distribution service, and postal service.

In order to make smooth data acquisition possible, the following configurations may also be adopted.

The PC unit may include means for displaying the externally captured image data on said display device, means for enabling audio communications through said audio device and said communication device, and means for transmitting the internally captured image data to outside through said communication means, when the function of TV phone is selected.

The PC unit may include means for turning off the screen display of the externally captured image data and returning the screen display to a state immediately preceding the shift to the function of TV phone, and means for continuing the audio communications though said audio device and said communication device, when a captured image display selection mark displayed on the display device is selected.

In this case, the PC unit may include means for displaying the internally captured image data on the display screen when the captured image display selection mark is selected.

The PC unit may include means for displaying a historical record of received calls on the display device and outputting audio information of the received calls to the user when the function of answering phone is selected.

In this case, the PC unit may include means for displaying the record of received calls as a list for allowing the user to select one of the calls on the record of received calls and means for outputting received audio information relating to the selected one of the calls on the record of received calls.

The interactive communications apparatus may further comprise a scanner for inputting facsimile data for transmission and a printer for printing the received facsimile data, and the PC unit may include means for displaying a list of received facsimiles and received facsimile data on the display device, means for printing the received facsimile data by the printer and means for transmitting inputted fax data to outside, when the function of facsimile is selected.

In this case, the PC unit may include means for displaying a list of received facsimiles on the display screen, means for allowing the user to select one of the facsimiles on the record of received facsimiles displayed on the display device, and means for displaying received facsimile data relating to the selected one of the record of received facsimiles on the display device.

The PC unit may include means for shifting the screen display to an e-mail display, means for enabling the function of the electronic mail when the item of e-mail is selected.

The PC unit includes means for shifting the screen display to an internet screen display and means for enabling a function of the internet when the function of internet access is selected.

The interactive communications apparatus may further comprise a card reader for reading credit card data, and the PC unit may include means for shifting the screen display to an internet shopping screen display, means for enabling an internet shopping function and means for transmitting the credit card data to outside through said communication device, when the function of home shopping is selected.

The PC unit may include means for connecting to an internet shopping site through said communication device, means for displaying a shopping menu of the internet shopping site on the display screen for allowing the user to select one of options of the displayed shopping menu, means for displaying shopping data relating to the selected option on the display device, audio communication means for audio communication with a guide of the connected internet shopping site, means for displaying an image of the guide of the connected internet shopping site, means for switching ON/OFF the image of the guide of the internet shopping site displayed on the display device when a captured image display selection mark on the display device is selected, and means for transmitting an image of the user to the guide of the internet shopping site, when the function of home shopping is selected.

The interactive communication apparatus may further comprise an additional camera for capturing an image of a visitor, and the PC unit includes means for displaying captured image data of a visitor on the display device, means for outputting audio of the visitor and means for displaying a record of visitors when the item of home security is selected.

The interactive communication apparatus may further comprise means for acquiring data of a medical device attached to a person or an animal as the internal information, and the PC unit may include means for displaying the acquired data on the display device, means for transmitting the internal data to a particular medical facility, means for displaying externally captured image data from the medical facility on the display device, means for enabling audio communication with the medical facility, and means for transmitting the internally captured image data to the medical facility, when the function of home security is selected.

The PC unit may include means for displaying a movie distribution menu on the display device for allowing the user to select one of options of the distribution menu, means for displaying video and outputting audio of a movie relating to the selected option on the display device, audio communication means for enabling audio communication with a guide of the distribution site, means for displaying an image of the guide of the distribution site on the display device, and means for transmitting an image of the user to the guide of the distribution site, when the function of movie distribution service is selected.

The PC unit may include means for displaying a postal service guide on the display device for allowing the user to select one of postal services of the postal service menu, means for displaying data relating to the selected postal service on the display device, means for enabling audio communication with a guide of the selected service, means for displaying an image of the guide of the service on the display device, and means for transmitting an image of the user to the guide of the service, when the function of postal service is selected.

The internally captured image data can be acquired by removing a cap covering the image sensor, so that internally captured image data can be acquired without performing any special operation.

It is preferable that the PC unit is removably housed in the case, allowing for replacement of the motherboard, the CPU or the memory to enable expansion of functions, and so forth.

BRIEF DESCRIPTION OF THE DRAWINGS

FIG. 34 is a diagram showing the display screen displaying a postal system insurance menu;

FIG. 35 is a diagram showing a TV phone display screen for postal service;

DETAILED DESCRIPTION

Preferred embodiments of the present invention are now described in detail, with reference to the accompanying drawings.

Figure 3:
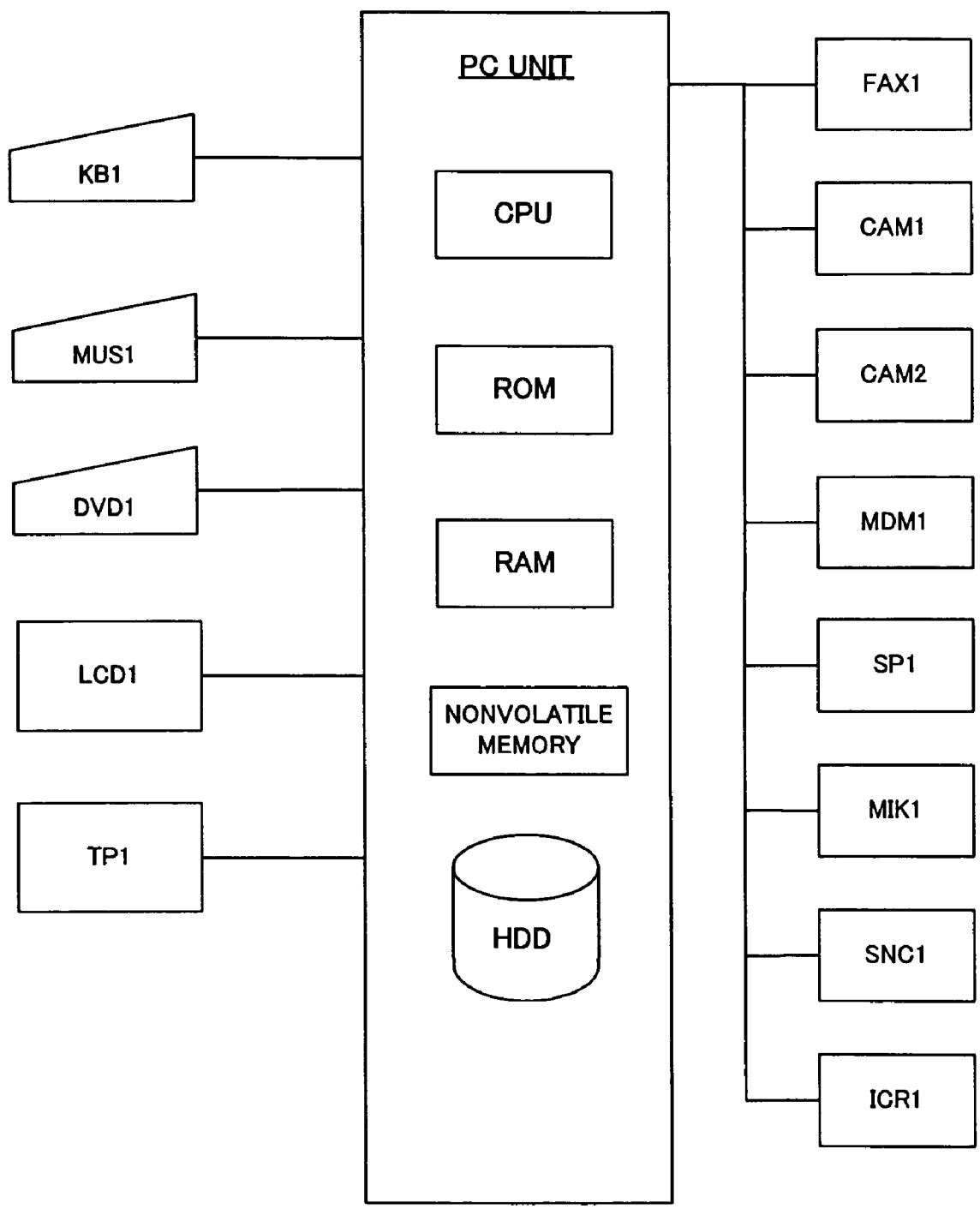
FIG. 3 is a block diagram showing the configuration of the interactive communication apparatus of the present invention.

FIG. 3 is a block diagram showing the configuration of the interactive communication apparatus of the present invention. As shown in FIG. 3, an interactive communication apparatus 1 of the present invention is controlled by a personal computer unit (hereinafter called a "PC unit") The PC unit is comprised of a motherboard, a microprocessor (hereinafter "CPU"), a read-only memory (hereinafter "ROM") and a random access memory ("RAM") mounted on the motherboard. A nonvolatile memory of large capacity or a downsized hard disk ("HDD") may be provided in the PC unit.

A boot loader for activating the PC unit is loaded into the ROM. Programs stored on the nonvolatile memory or the HDD are comprised of an operating system OS, input-output driver, applications, and so forth. These programs are rendered onto the RAM and controlled by the CPU.

The PC unit is equipped with typical interfaces such as a USB interface, a keyboard interface, a mouse interface, an IDE interface, an RS232 interface, a video interface and a SCIS interface.

To the foregoing interfaces are connected such input-output devices as a communications device MDM1, a speaker SP1, a microphone MIK1, a camera CAM1, a camera CAM2, a sensor SNC1, a liquid crystal display LCD1, a facsimile FAX1, a touch panel TP1, a mouse MUS1, a keyboard KB1, a DVD driver DVD1 and an IC card reader/writer ICR1.

Figure 1:
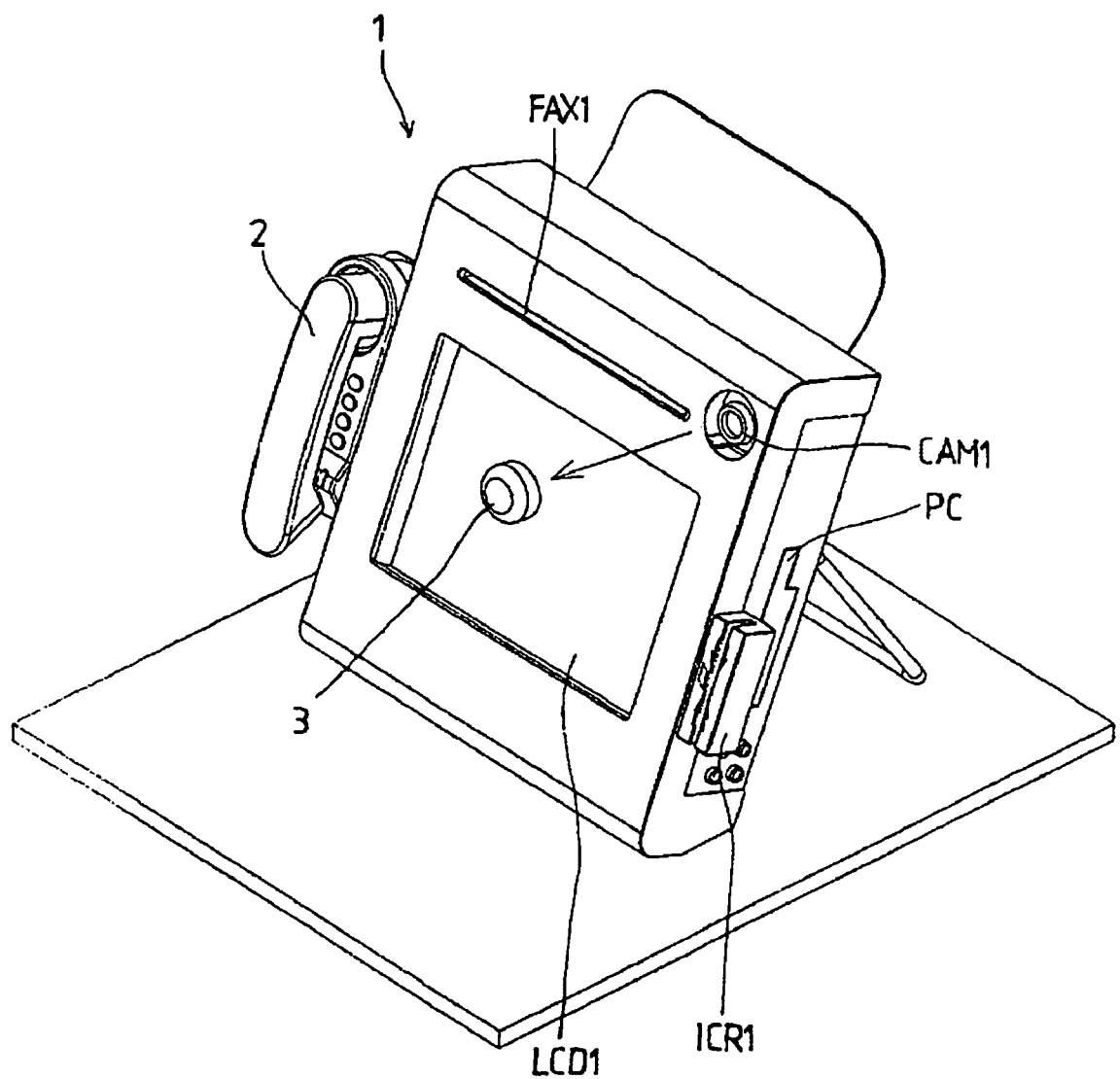
FIG. 1 is a diagram showing a perspective view of a state in which a cap of the interactive communication apparatus of the present invention is removed.
Figure 2:
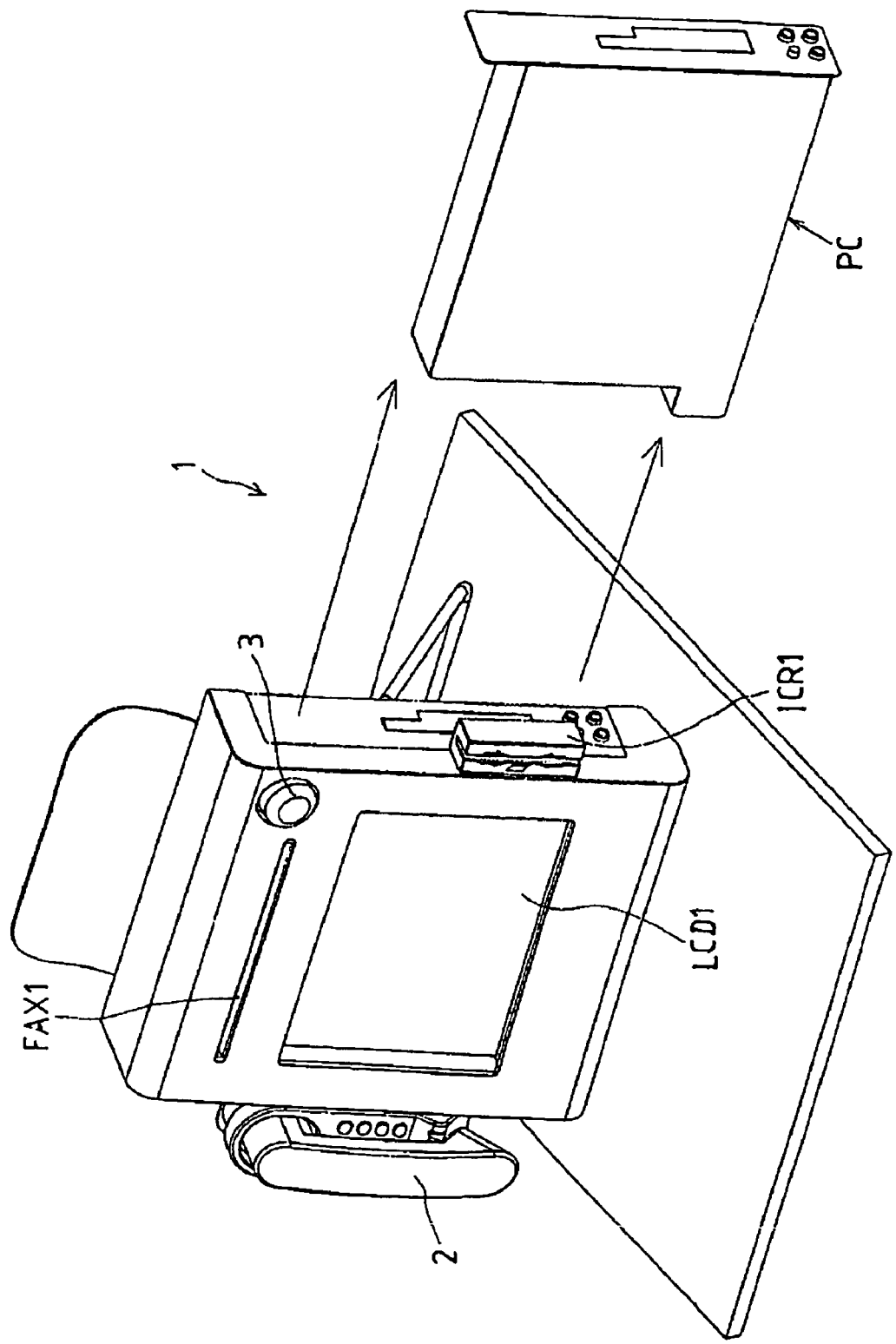
FIG. 2 is a diagram showing a perspective view of a state in which the motherboard of the interactive communication apparatus of the present invention is removed.

Moreover, as shown in FIG. 1 and FIG. 2, the PC unit is of a removable type, in which the above-described input-output devices can be connected just by insertion, for easy removal from and installation in the interactive communication apparatus 1 for repair or expansion.

Using the above-described input-output devices connected to the respective interfaces, the interactive communication apparatus 1 is programmed to carry out the functions of a TV phone, an answering phone, a facsimile machine, e-mail, internet, home shopping, home security, movie distribution service and postal service.

A communications device for communicating externally is connected to the typical interfaces with which a PC unit is equipped, such as a USB interface, an RS232 interface, a PCI bus, a PCMCIA bus, etc.

In the present embodiment, the communications device MDM1 is an ADSL modem, connected to the USB interface of the PC unit. It should be noted that the type of communications device MDM1 can be freely selected according to the type of line used. Thus, for example, if a LAN is used, then the communications device MDM1 may be a LAN card, and if an ISDN line is used then the communications device MDM1 may be an ISDN modem. Naturally, the communications device selected is connected to the interface on the PC unit that fits that device.

The communications device MDM1 becomes a means of acquiring external image data as well as externally captured image data, as well as a means of transmitting internal data and internally captured image data. The acquisition of external data and externally captured image data as well as the transmission of internal data and internally captured image data described in the present embodiment involve the communications device MDM1 operating as a physical interface.

Acquisition of external data and externally captured image data includes processing data transmitted from the outside into a usable form at the PC unit. Transmission of internal data and internally captured image data externally to the outside includes processing the data at the PC unit into a form that can be received and processed by the receiver.

The speaker SP1 is connected to the USB interface and outputs audio external data as well as audio generated internally at the PC unit. Audio is output and audio communications can be performed through the speaker SP1 when carrying out the functions of the TV phone, answering phone, facsimile machine, e-mail, internet, home shopping, home security, movie distribution service and postal service.

The microphone MIK1 is built into a telephone receiver 2 provided on a side part of the interactive communication apparatus 1, and is connected to a USB interface. Audio from the user of the interactive communication apparatus 1 is input as internal data and audio communications can be performed through the speaker SP1 when using the TV phone, home shopping, home security, movie distribution and other service functions.

The image sensor camera CAM1 is comprised of a CCD camera, and is disposed at a front corner of the interactive communication apparatus 1 and connected to the USB interface.

In addition, a detachable cap 3 covers the camera CAM1. When the cap 3 is removed, the camera CAM1 senses the image of the user facing the front of the interactive communication apparatus 1 and inputs the sensed image as internally captured image data for the TV phone, answering phone, home shopping, home security, movie distribution and other services.

The image sensor camera CAM2, which is disposed at a building entrance and the like, is connected to a USB interface, and, in the home security function, senses the image of a visitor to the entrance and reads the sensed image as internally captured image data.

In addition, the sensor SNC1, which is also disposed at a building entrance or the like and connected to a USB interface, and the home security function detect a visitor at the entrance. When the sensor SNC1 detects a visitor, the camera CAM2 is activated and senses the image of the visitor.

Moreover, if the sensor SNC1 detects an intruder after a security lock has been engaged, the user can also address the intruder through a microphone provided on the sensor SNC1, contact a security center or the police, and so forth.

The liquid crystal display LCD1 is disposed front and center on the interactive communication apparatus 1 and connected to a video interface. Then, menu choices, external data and externally captured image data acquired by the communications device MDM1, internal data acquired from the input devices, and internally captured image data acquired by the camera CAM1 and the camera CAM2 can be displayed on the display screen of the liquid crystal display LCD1.

The facsimile FAX1 is disposed on the front top of the interactive communication apparatus 1 and connected to a USB interface. The facsimile FAX1 performs fax data input and-data output, and can also output liquid crystal display LCD1 display screen data as well as input image data.

The touch panel TP1 is connected to a RS232 interface. The touch panel TP1 overlays the liquid crystal display LCD1 display screen, and enables the user to perform a selection by touching the choices, the selections pertaining to the choices, and the various marks.

The mouse MUS1 is connected to a mouse-dedicated interface. Clicking the mouse selects the choices and the various marks displayed on the display screen.

The keyboard KB1 is connected to a keyboard-dedicated interface. Using the keyboard enables the user to select the choices and the various marks displayed on the display screen and to input text.

The DVD drive DVD1 is connected to an IDE interface and is used to install programs in the PC unit, to input files, and so forth.

The IC card reader/writer ICR1 is connected to a USB interface, and inputs credit card data when home shopping.

Next, a description is now given of the interactive communication apparatus 1 operating steps and processing routines.

Figure 4:
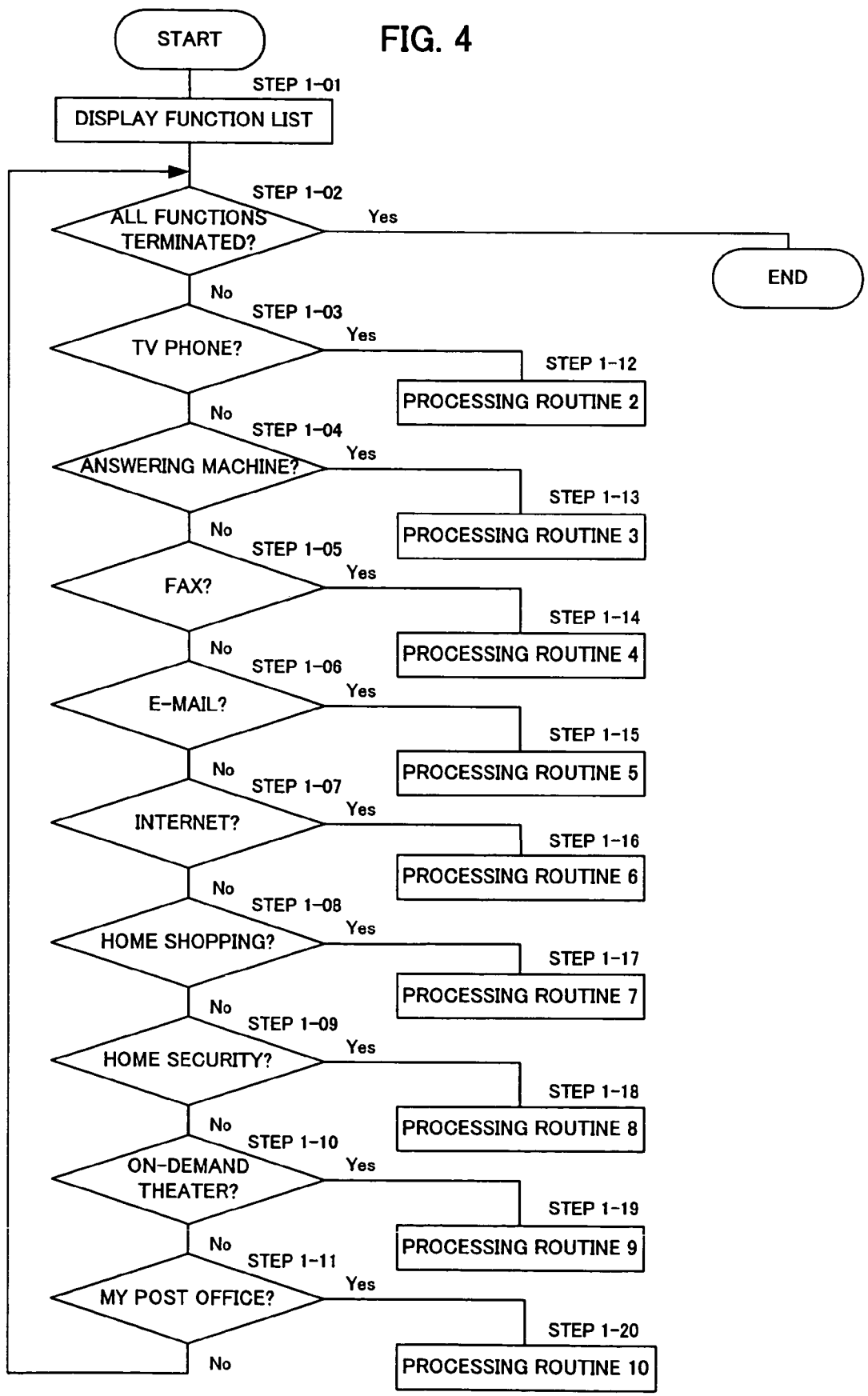
FIG. 4 is a flow chart showing a processing routine 1.

FIG. 4 is a flow chart showing a processing routine 1. When activated, the interactive communication apparatus 1 performs STEP 1-01 in processing routine 1.

Figure 14:
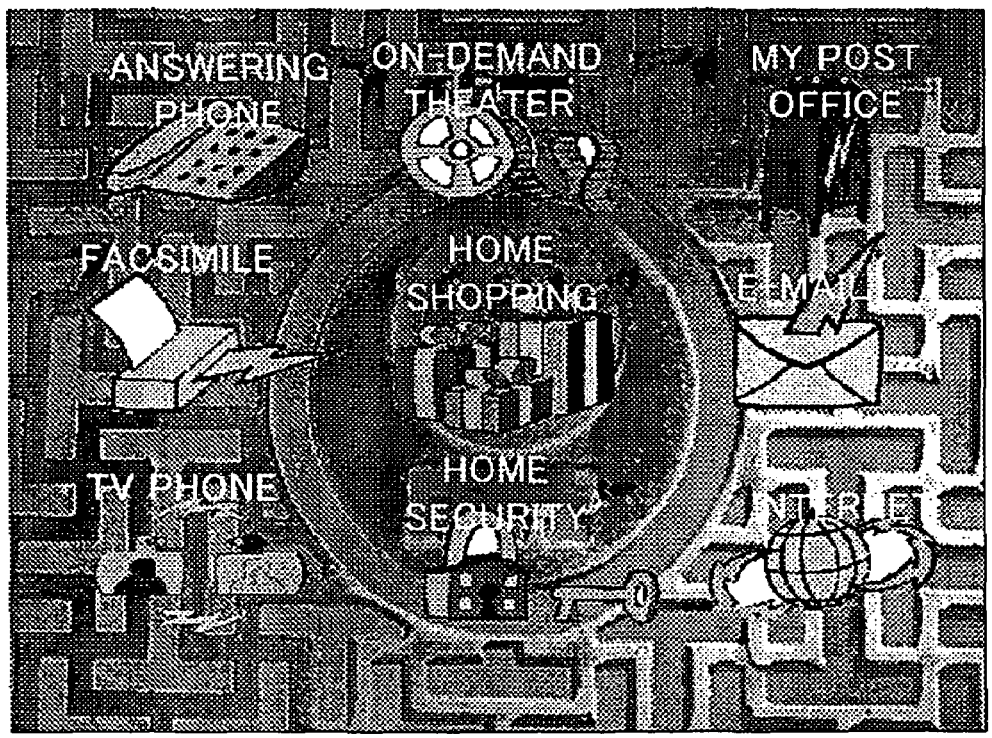
FIG. 14 is a diagram showing a display screen displaying choices.

In a STEP 1-01, the interactive communication apparatus 1 displays items of functions of TV phone, answering phone, facsimile, e-mail, internet, home shopping, home security, movie distribution service and postal service on the liquid crystal display LCD1 display screen as shown in FIG. 14. The display screen in FIG. 14 displays the movie distribution service and the postal service as "On-Demand Theater" and as "My Post Office", respectively.

A succeeding STEP 1-02 confirms that operation of the interactive communication apparatus 1 is finished. Termination of the operation of the interactive communication apparatus 1 can be selected at any time.

If termination of the operation of the interactive communication apparatus 1 is not selected, then the processing routine proceeds from STEP 1-03 through STEP 1-10 and one of the above-described choices is selected using the touch panel TP1, the mouse MUS1 or the keyboard KB1.

Figure 5:
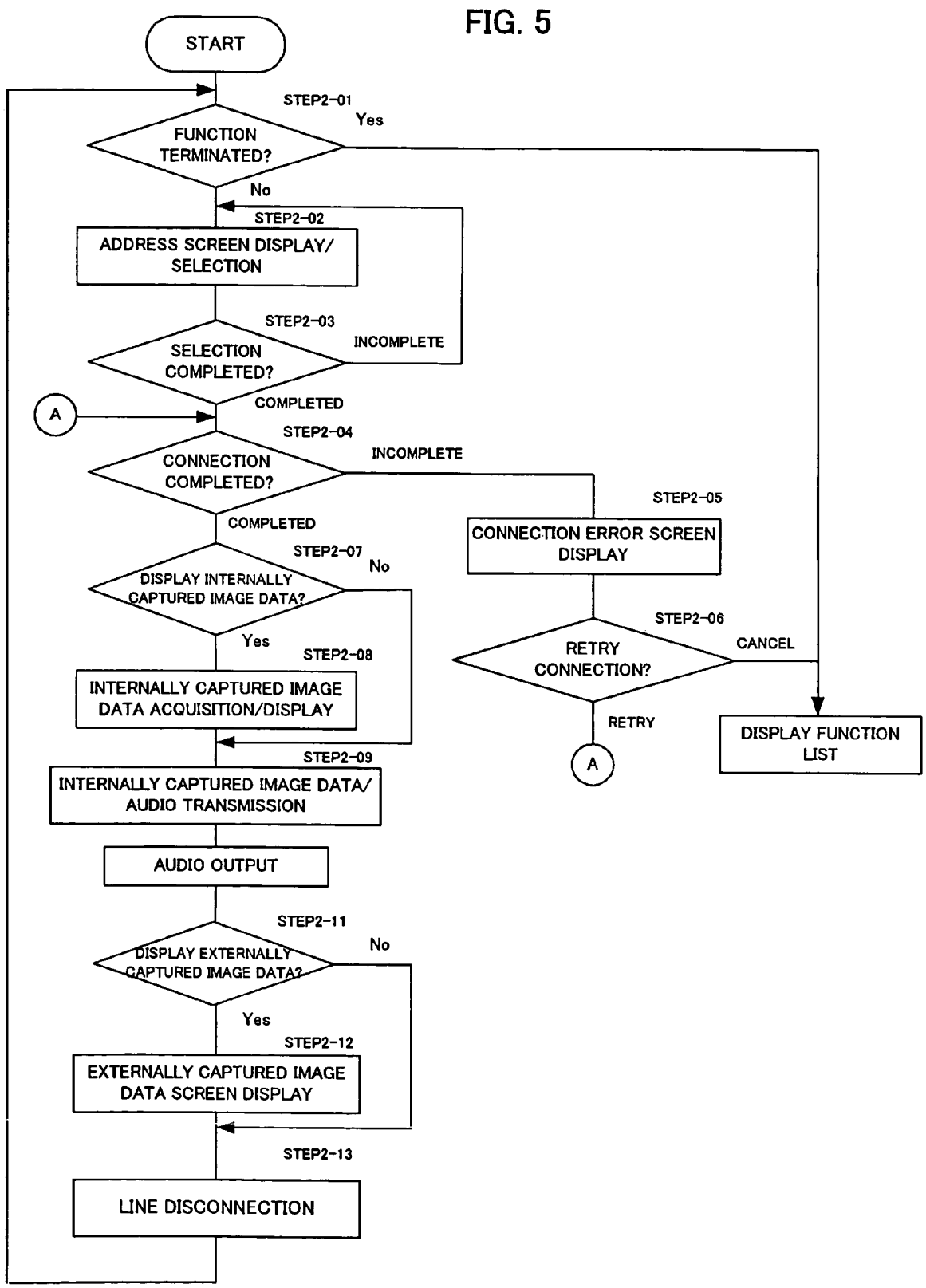
FIG. 5 is a flow chart showing a processing routine 2.

In a STEP 1-03, when "TV phone" is selected, the processing routine proceeds to STEP 1-12 and the TV phone function is enabled by the processing routine 2 shown in FIG. 5.

Figure 6:
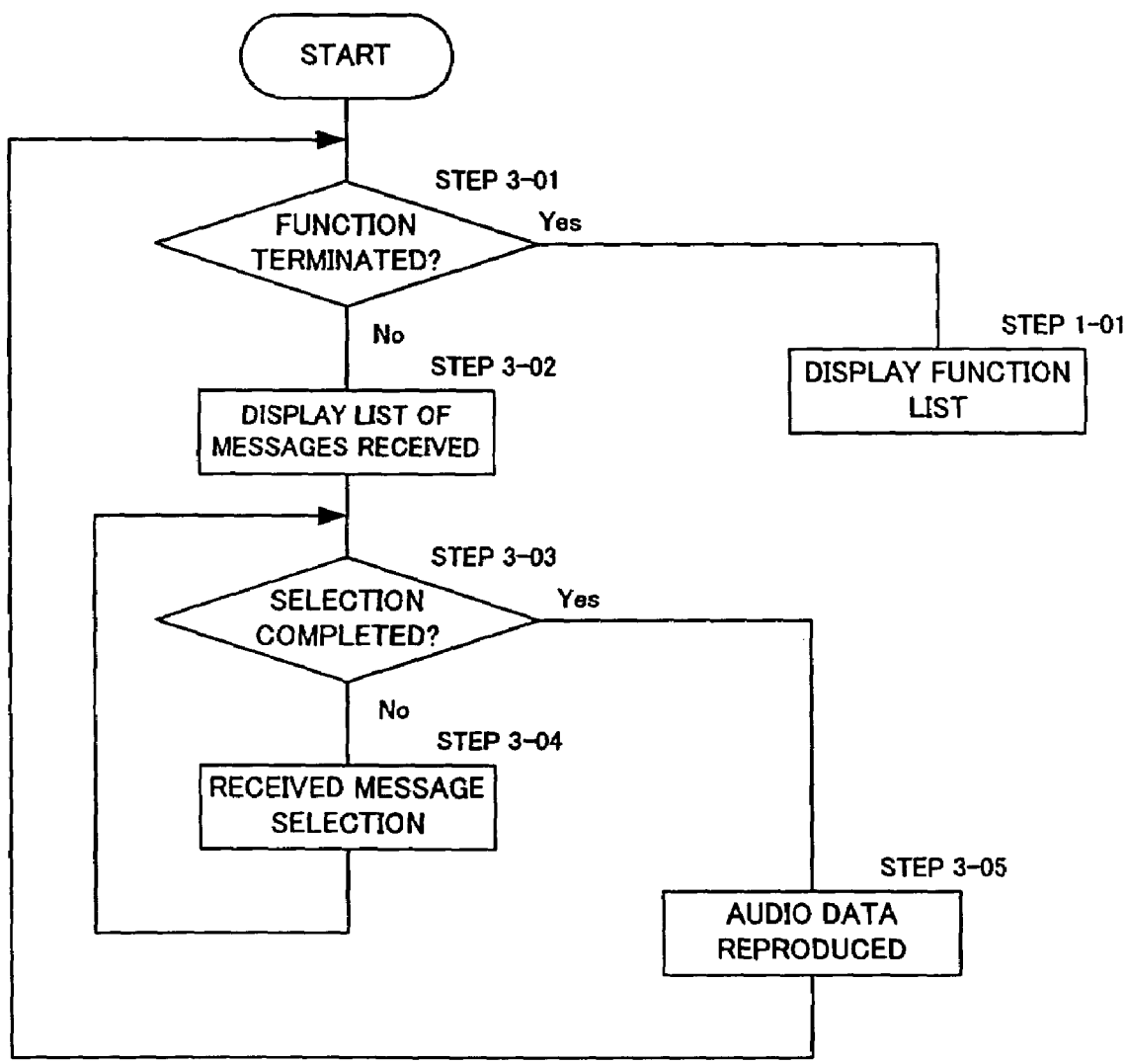
FIG. 6 is a flow chart showing a processing routine 3.

In a STEP 1-04, when "answering phone" is selected, the processing routine proceeds to STEP 1-13 and the answering phone function is enabled by the processing routine 3 shown in FIG. 6.

Figure 7:
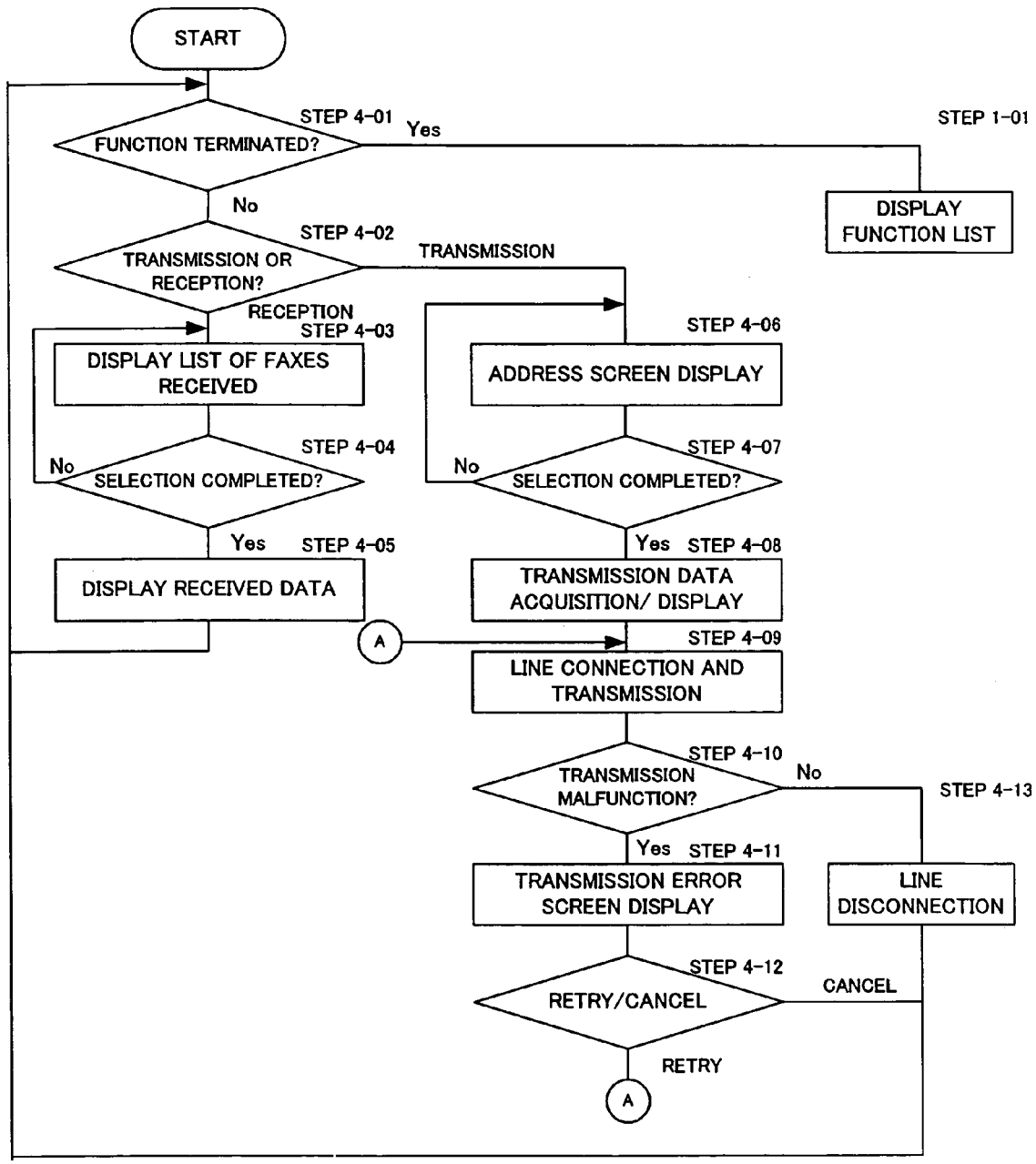
FIG. 7 is a flow chart showing a processing routine 4.

In a STEP 1-05, when "FAX" is selected, the processing routine proceeds to STEP 1-14 and the fax function is enabled by the processing routine 4 shown in FIG. 7.

Figure 8:
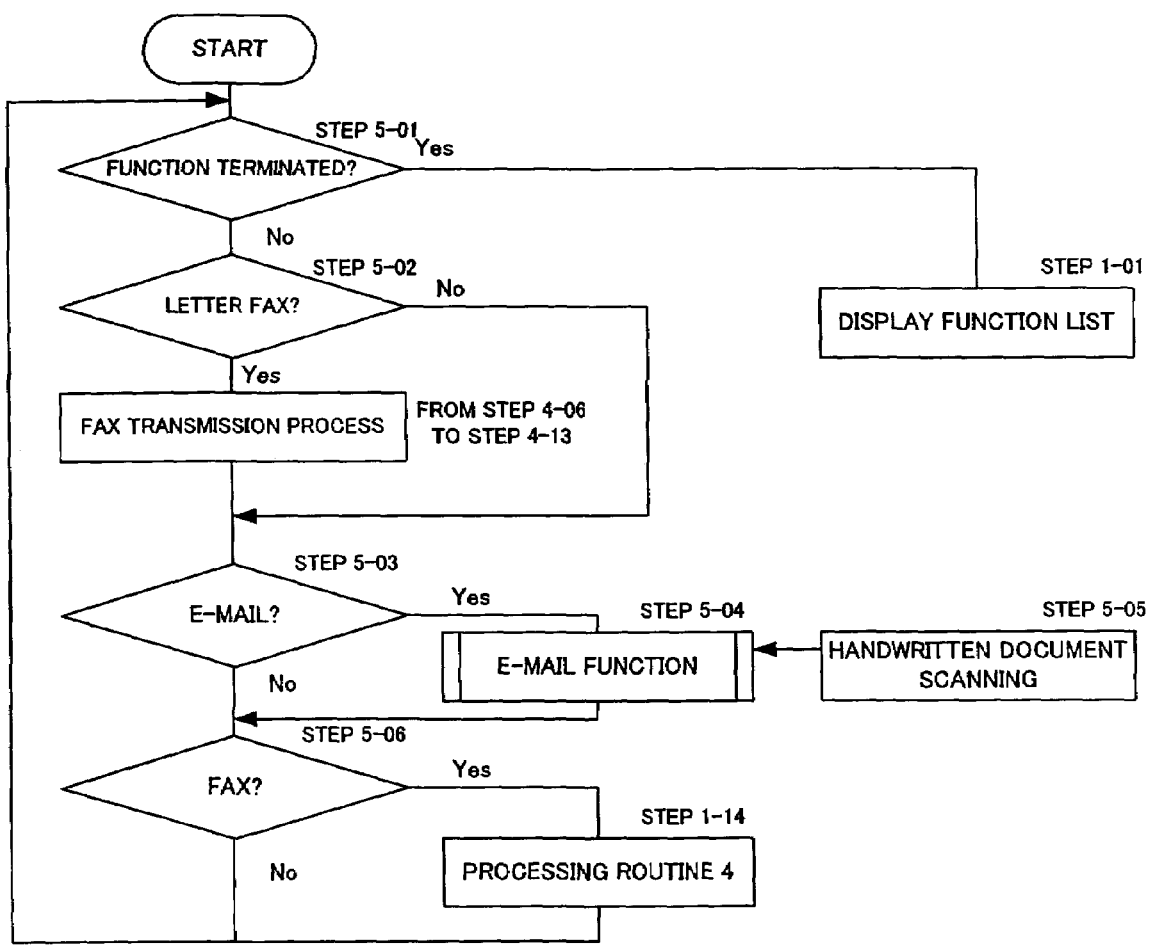
FIG. 8 is a flow chart showing a processing routine 5.

In a STEP 1-06, when "E-mail" is selected, the processing routine proceeds to STEP 1-15 and the e-mail function is enabled by the processing routine 5 shown in FIG. 8.

Figure 9:
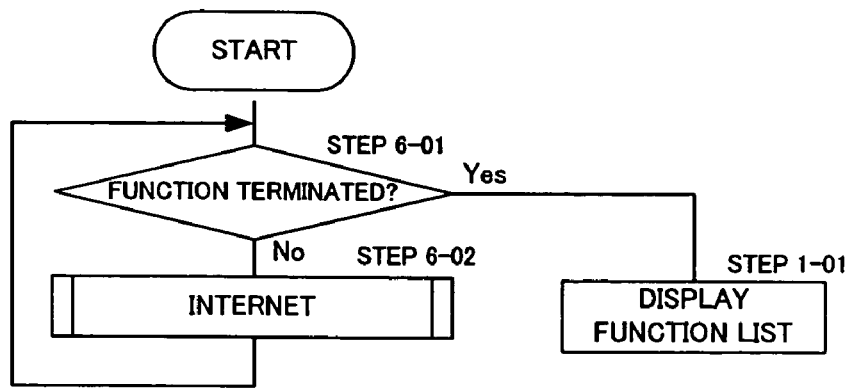
FIG. 9 is a flow chart showing a processing routine 6.

In a STEP 1-07, when "Internet" is selected, the processing routine proceeds to STEP 1-16 and the internet function is enabled by the processing routine 6 shown in FIG. 9.

Figure 10:
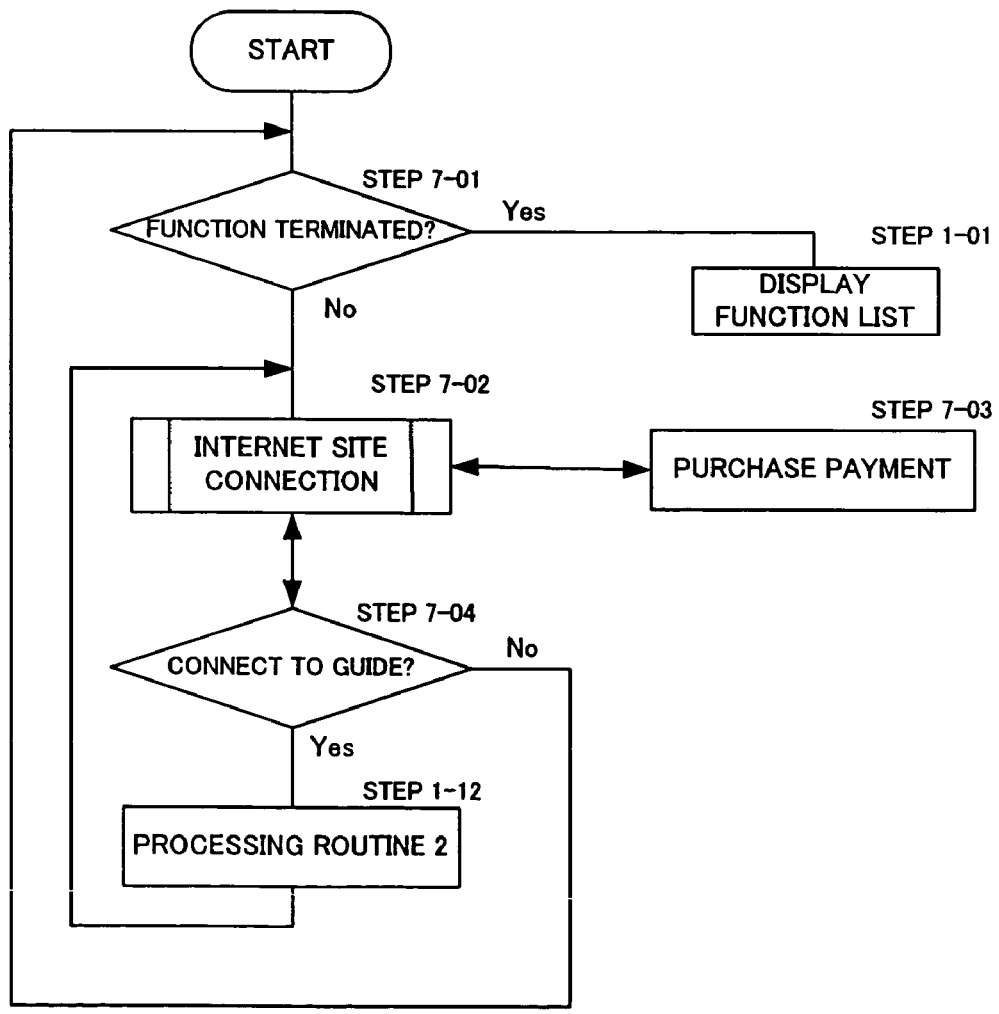
FIG. 10 is a flow chart showing a processing routine 7.

In a STEP 1-08, when "Home Shopping" is selected, the processing routine proceeds to STEP 1-17 and the home shopping function is enabled by the processing routine 7 shown in FIG. 10.

Figure 11:
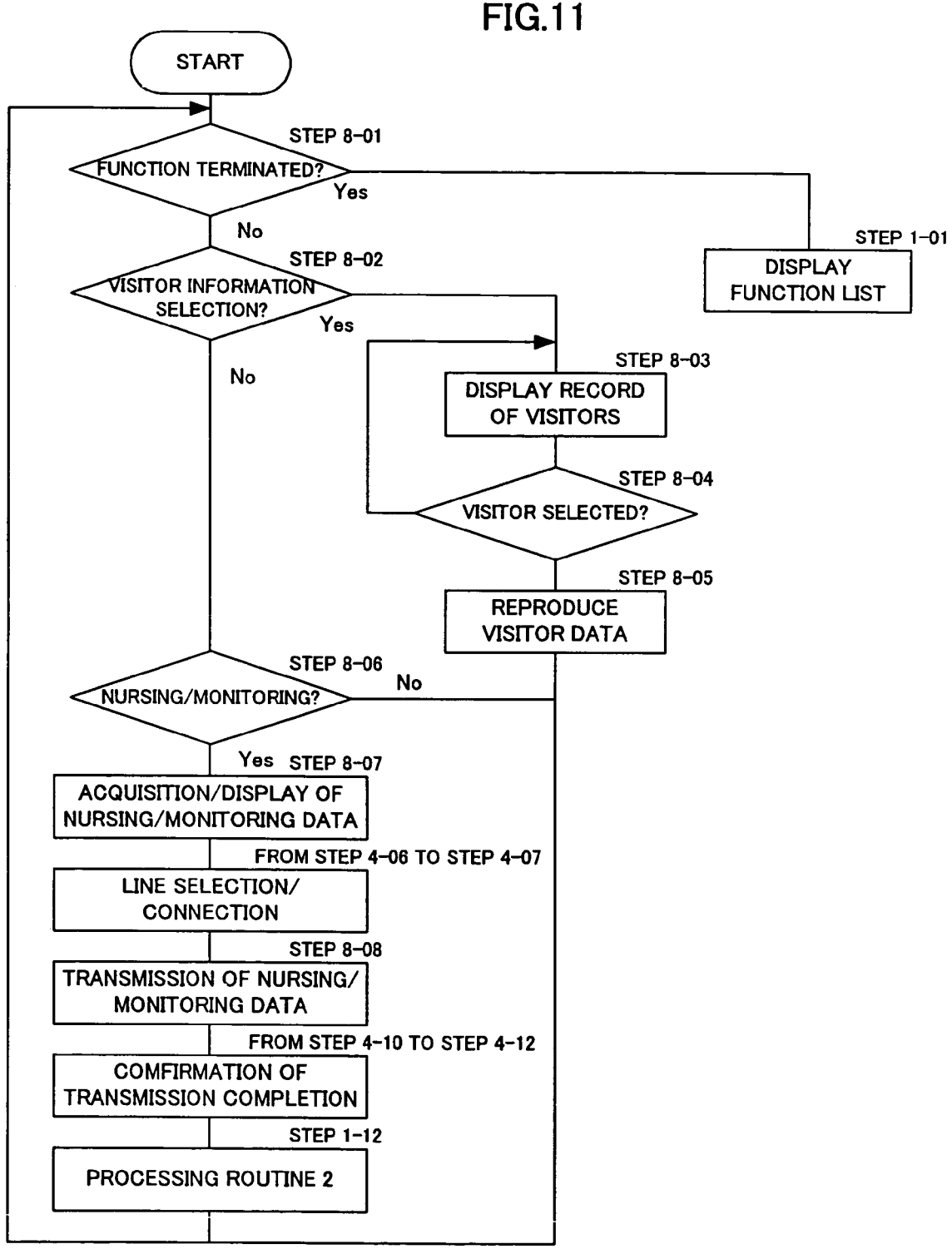
FIG. 11 is a flow chart showing a processing routine 8.

In a STEP 1-09, when "Home Security" is selected, the processing routine proceeds to STEP 1-18 and the home security function is enabled by the processing routine 8 shown in FIG. 11.

Figure 12:
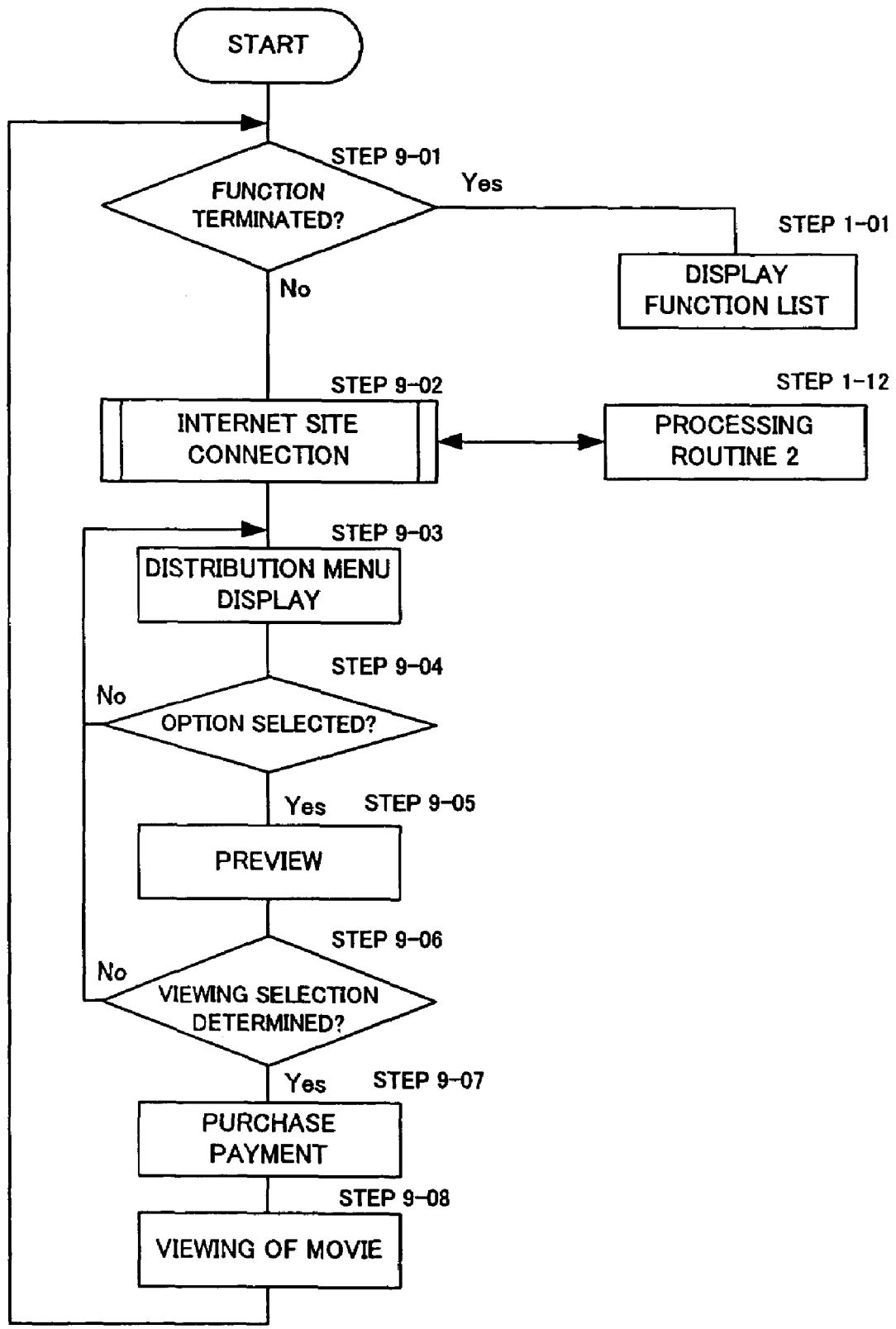
FIG. 12 is a flow chart showing a processing routine 9.

In a STEP 1-10, when "On Demand Theater" is selected, the processing routine proceeds to STEP 1-19 and the movie distribution service function is enabled by the processing routine 8 shown in FIG. 12.

Figure 13:
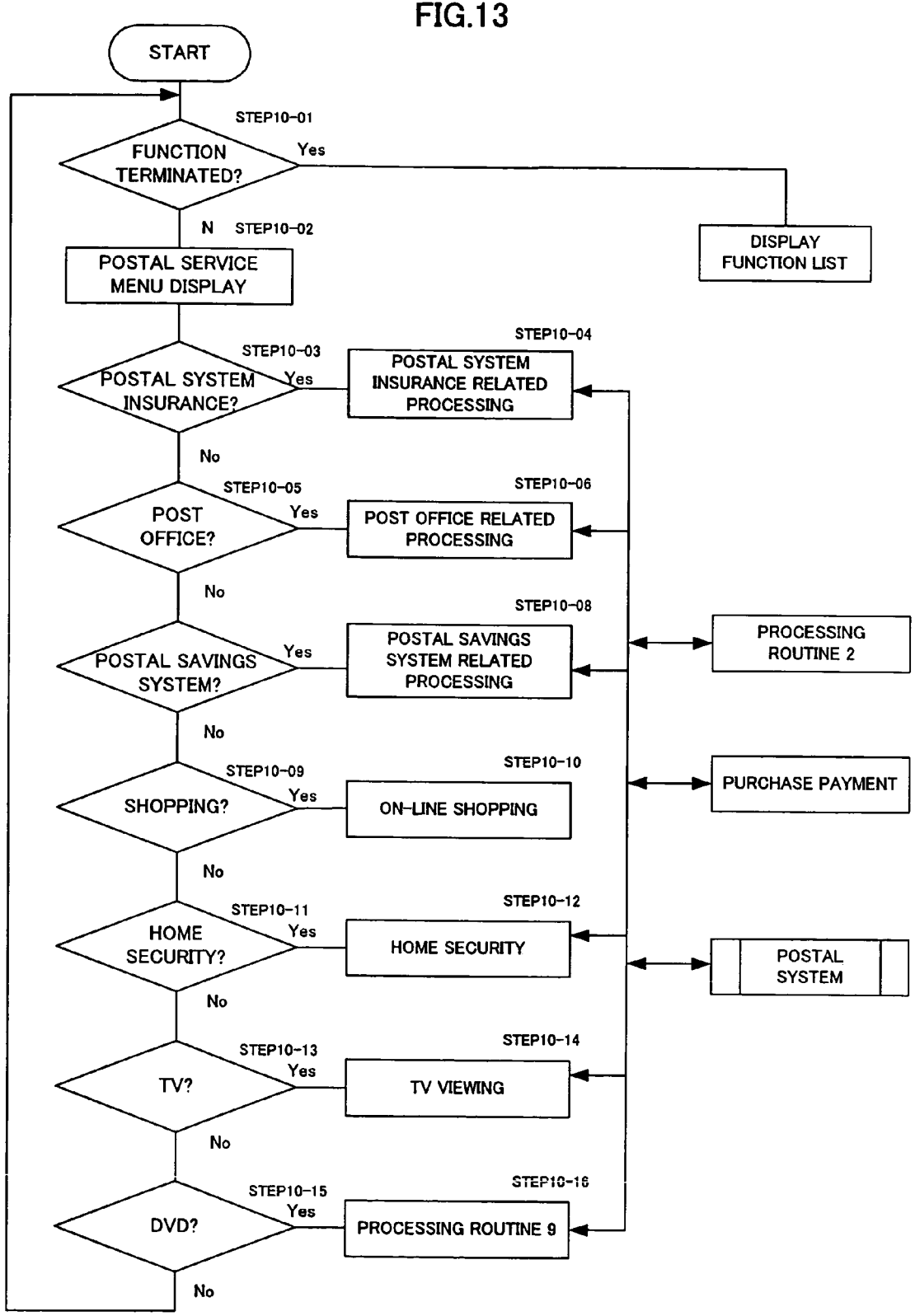
FIG. 13 is a flow chart showing a processing routine 10.

In a STEP 1-11, when "My Post Office" is selected, the processing routine proceeds to STEP 1-20 and the postal service function is enabled by the processing routine 8 shown in FIG. 13.

FIG. 5 is a flow chart showing a TV phone function processing routine 2.

When the TV phone is selected from among the list of choices displayed, first, in a STEP 2-01 it is confirmed that operation of the TV phone is terminated. When TV phone operation termination is selected, processing returns to STEP 1-01 of the processing routine 1.

It should be noted that operation of the TV phone can be terminated both after TV phone communication has ended as well as during communication.

Figure 15:
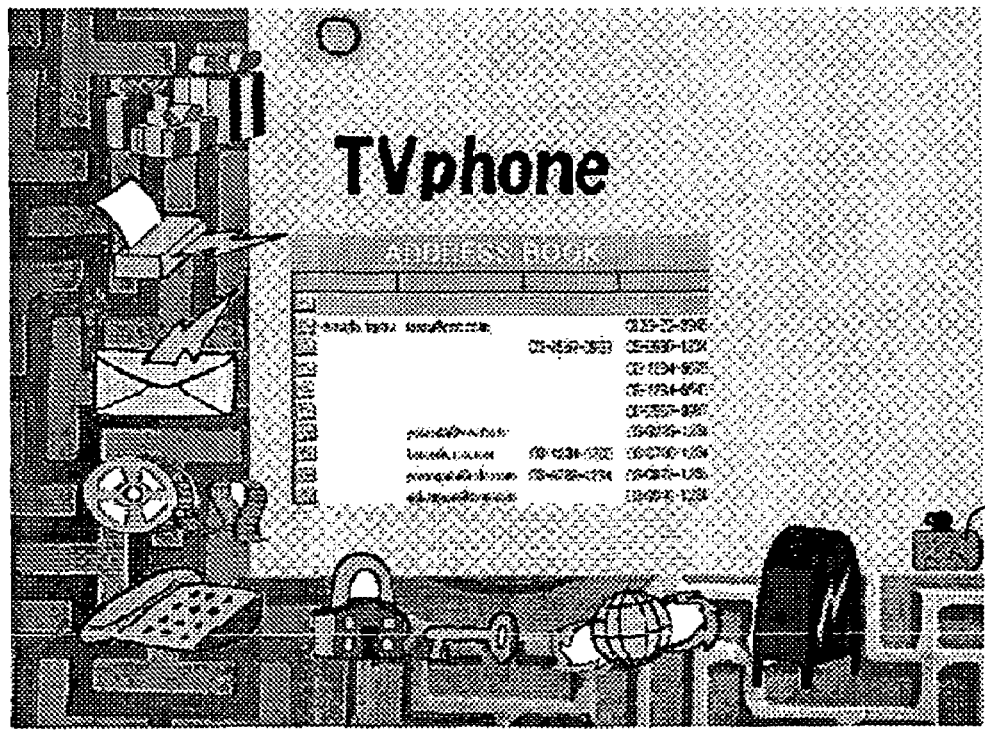
FIG. 15 is a diagram showing the display screen displaying externally captured image data at a TV phone.

When in STEP 2-01 termination of the operation of the TV phone is not selected, processing proceeds to a STEP 2-02 and a list of previously stored e-mail addresses is displayed on the liquid crystal display LCD1 as possible selections (FIG. 15), so as to be able to select the other party's line.

The names and telephone numbers of other parties are previously matched and registered in the interactive communication apparatus 1, and therefore the other party's line can be selected either from the other party's name or directly from the other party's phone number.

From the displayed list of recipient addresses, the user selects an arbitrary address using the touch panel TP1, the mouse MUS1 or the keyboard KB1 and connects the line, and the processing routine proceeds to a STEP 2-03.

In STEP 2-03, it is confirmed that selection of the other party's line is finished. If selection is not finished, processing returns to STEP 2-02. If selection is finished, the processing routine proceeds to a STEP 2-04.

In STEP 2-04, it is confirmed whether or not the line has been properly connected. If the line has been connected, then the processing routine proceeds to a STEP 2-05.

Figure 18:
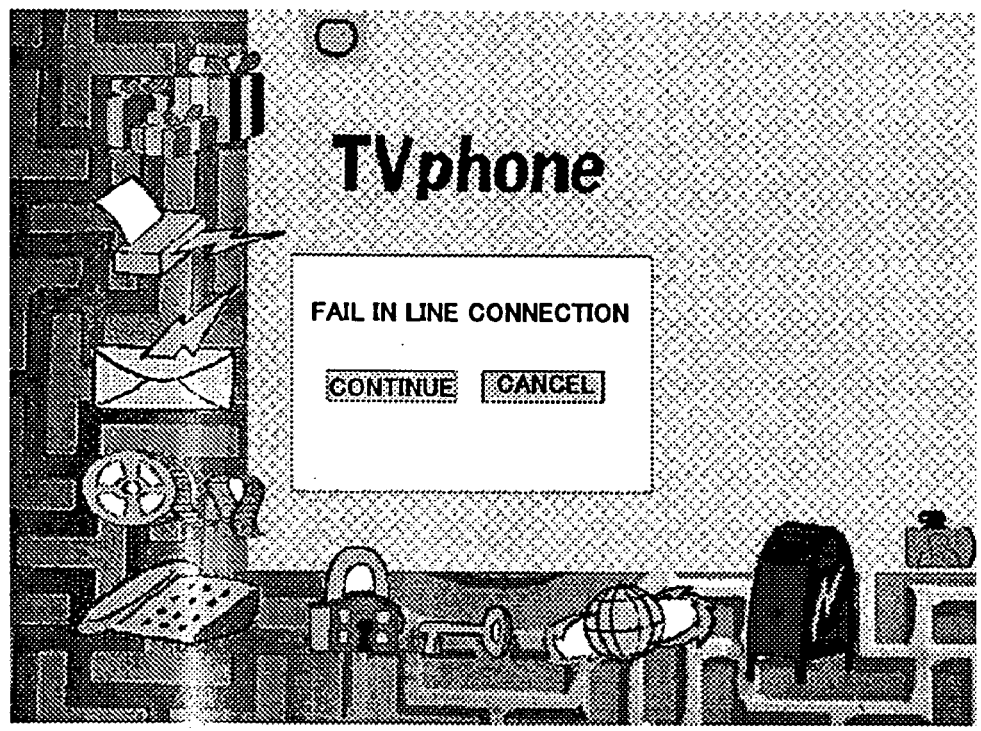
FIG. 18 is a diagram showing the display screen showing confirmation of a line connection retry.

In STEP 2-05, the interactive communication apparatus 1 displays a screen as shown in FIG. 18 that enables the user either to select a line connection retry or to cancel the connection and terminate the TV phone.

When in a STEP 2-06 a connection retry is selected, then processing returns to after STEP 2-03 and a line connection retry is attempted. On the other hand, when the user elects to cancel the connection, the processing routine proceeds to STEP 1-01 of processing routine 1, a list of choices is displayed on the display screen and operation of the TV phone is terminated.

In a STEP 2-07, it is determined whether or not interactive communication apparatus 1 camera CAM1 internally captured image data display has been selected.

If the cap 3 has been removed from the lens of the camera CAM1, the interactive communication apparatus 1 assumes that acquisition of internally captured image data has been selected and the interactive communication apparatus 1 acquires an image of the user taken by the camera CAM1 as internally captured image data.

When internally captured image data display has been selected, or is selected, the processing routine proceeds to a STEP 2-08 and the internally captured image data is displayed on the display screen.

Then, in a succeeding STEP 2-09, audio input via the microphone MIK1 and the interactive communication apparatus 1 internally captured image data is transmitted to the other party and the processing routine proceeds to a STEP 2-10. In the event that it is not desired to transmit an image of the user to the other party, the cap 3 may be left covering the lens of the camera CAM1.

Next, in STEP 2-10, the audio transmitted from the other party is output by the speaker SP1.

Further, in a STEP 2-11, a selection is made to display or not to display the externally captured image data.

When display of externally captured image data is selected, the processing routine proceeds to a STEP 2-12 and externally captured image data transmitted from the other party is displayed on the display screen.

The presence or absence of a display of internally captured image data and externally captured image data is determined by selection of a sensed image data display selection mark 4 (FIG. 15 and FIG. 16) using the touch panel TP1, the mouse MUS1 or the keyboard KB1, so that the user can switch between display and non-display with each selection of the mark 4.

The interactive communication apparatus 1 makes it possible to terminate the display screen display of internally captured image data and externally captured image data at any time. That is, even if the internally captured image data and externally captured image data display screen display termination is selected while the TV phone is in use, display of the internally captured image data and the externally captured image data is terminated. Then, as is described later, when a function other than TV phone is selected and the user shifts to the TV phone function while using that other function, the interactive communication apparatus 1 automatically returns to a display of the display screen in use immediately prior to shifting to the TV phone function.

It should be noted that, when internally captured image data and externally captured image data are displayed on the display screen, the interactive communication apparatus 1 can be returned to the display screen displayed immediately prior to shifting to the TV phone function by selecting not the sensed image data selection mark 4 but the marks of the choices displayed on the same display screen.

Returning to the display screen displayed immediately prior to shifting to the TV phone function means that it is possible to use the various functions of the interactive communication apparatus 1 and the TV phone function in parallel.

Figure 16:
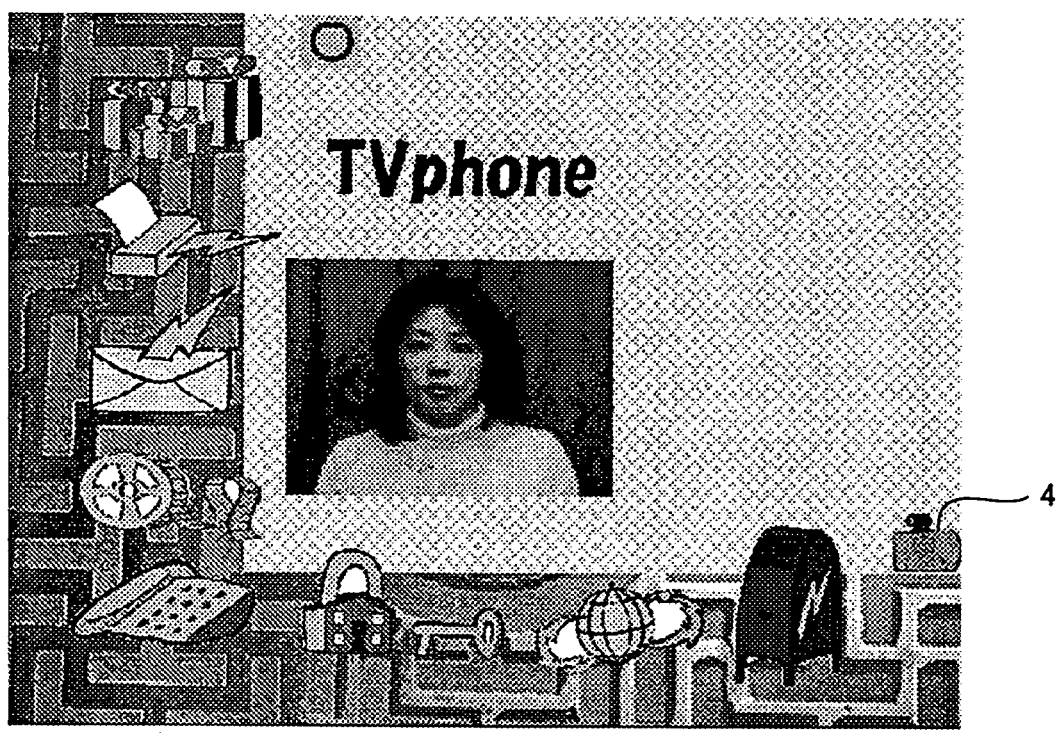
FIG. 16 is a diagram showing the display screen displaying externally captured image data at the TV phone.
Figure 17:
FIG. 17 is a diagram showing the display screen displaying externally captured image data and internally captured image data at the TV phone.

FIG. 16 is a diagram showing the display screen displayed when only display of externally captured image data is selected. FIG. 17 is a diagram showing the display screen displayed when display of both externally captured image data and internally captured image data is selected. In FIG. 17, the small image in the upper right corner of the display screen is the internally captured image data and the large image in the lower left of the display screen is the externally captured image data. Moreover, FIG. 17 is a diagram showing a case in which, by selecting a mark for a choice displayed on the display screen, the interactive communication apparatus 1 is returned to the display screen displayed immediately before shifting to the TV phone function, and therefore the sensed image data display selection mark 4 is not displayed on the display screen.

When the user has finished use of the TV phone, in a STEP 2-13 the line is disconnected and the processing routine returns to STEP 2-01.

FIG. 6 is a flow chart showing an answering phone function processing routine 3.

When the answering phone function is selected from among the choices displayed on the display screen, first, in a STEP 3-01, it is confirmed whether or not termination of the operation of the answering phone function has been selected.

Termination of the answering phone function can also be selected at any time after the answering phone function has been selected and under any and all circumstances, whether after message reproduction or during message reproduction.

When termination of the answering phone function is selected, the processing routine proceeds to STEP 1-01 in processing routine 1, a list of choices for selecting the functions of the interactive communication apparatus 1 is displayed on the display screen and operation of the answering phone function is terminated.

Figure 19:
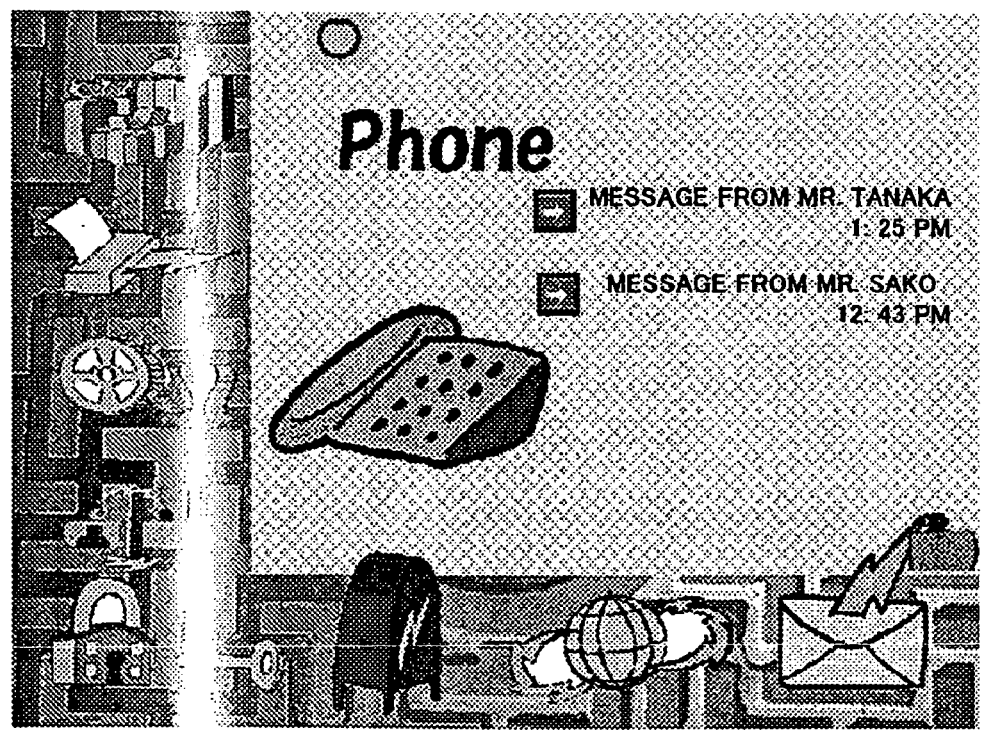
FIG. 19 is a diagram showing the display screen displaying a record of messages received at an answering phone.

When termination of the answering phone function is not selected, the processing routine proceeds to a STEP 3-02 and the interactive communication apparatus 1 displays for selection on the display screen a list of several of the most recent messages received as shown in FIG. 19.

As display of the record of messages received the name of the other party, the date and time of the call, the telephone number and so forth can be displayed from a previously registered correspondence between telephone numbers and other party names, from which any one record can be selected and the received data reproduced.

Next, in a STEP 3-03, it is confirmed whether or not any one of the records of messages received has been selected, and if not, the processing routine proceeds to a STEP 3-04 and one of the records of messages received is selected.

When selection is finished, in a STEP 3-05 the interactive communication apparatus 1 acquires audio data from the reception data corresponding to the record of messages received that has been selected and reproduces that audio data at the speaker SP1.

When reproduction is finished, the processing routine returns to STEP 3-01.

FIG. 7 is a flow chart showing a FAX function processing routine 4.

When the facsimile function is selected from among the choices displayed on the display screen, first, in a STEP 4-01, it is confirmed whether or not termination of the operation of the facsimile function has been selected.

Termination of the facsimile function can also be selected at any time after the facsimile function has been selected, under any and all circumstances.

When termination of the facsimile function is selected, the processing routine proceeds to STEP 1-01 in processing routine 1, the list of choices for selecting the functions of the interactive communication apparatus 1 is displayed on the display screen and operation of the facsimile function is terminated.

When termination of the facsimile function is not selected, the processing routine proceeds to a STEP 4-02 where the user selects either FAX transmission or FAX reception.

Figure 20:
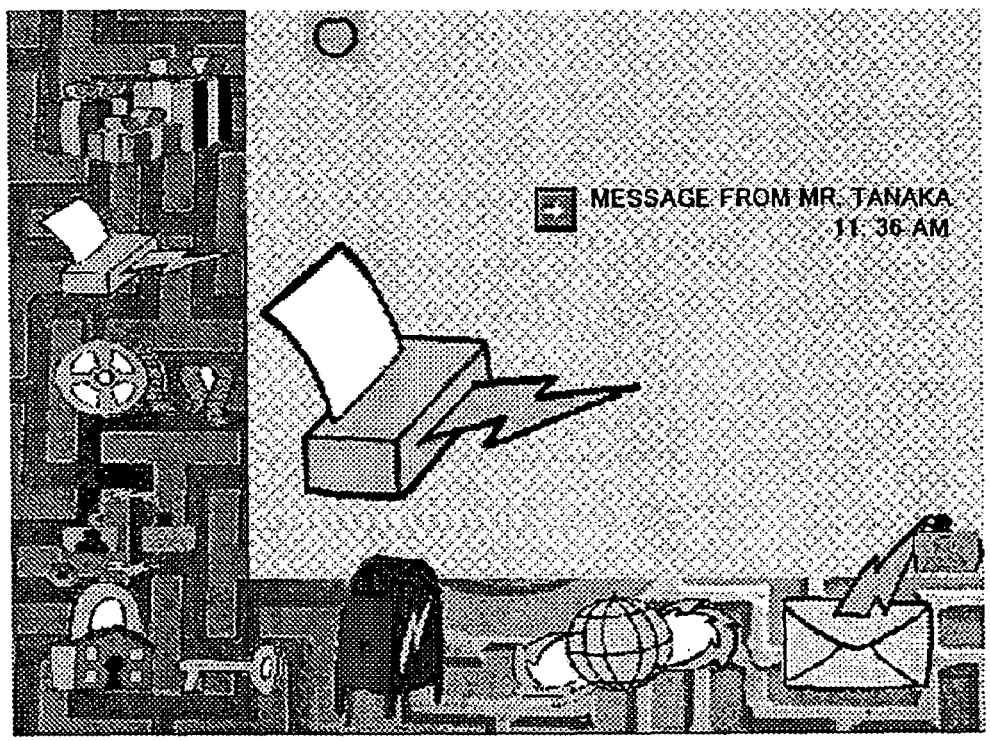
FIG. 20 is a diagram showing the display screen displaying a record of faxes received.

When FAX reception is selected, the processing routine proceeds to a STEP 4-03 and the interactive communication apparatus 1 displays for selection on the display screen a list of several of the most recent faxes received as shown in FIG. 20. The record of facsimiles received can display a list of other party names, date and time received, telephone number and so forth, from a previously registered correspondence between telephone numbers and other party names. Any one of the entries in the record can be selected from the list and the received data reproduced.

Next, in a STEP 4-04, received data to be displayed is selected from the record of facsimiles received.

Figure 21:
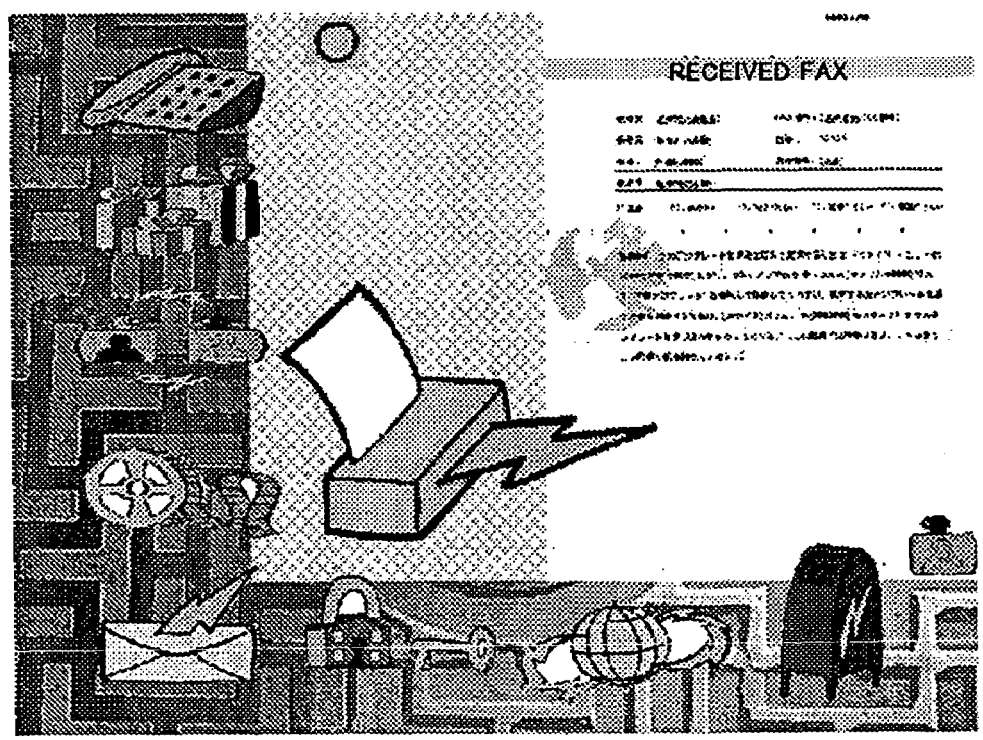
FIG. 21 is a diagram showing the display screen displaying receipt of a fax.

In a STEP 4-05 the interactive communication apparatus 1 acquires the received data and displays the data on the display screen as shown in FIG. 21.

Figure 22:
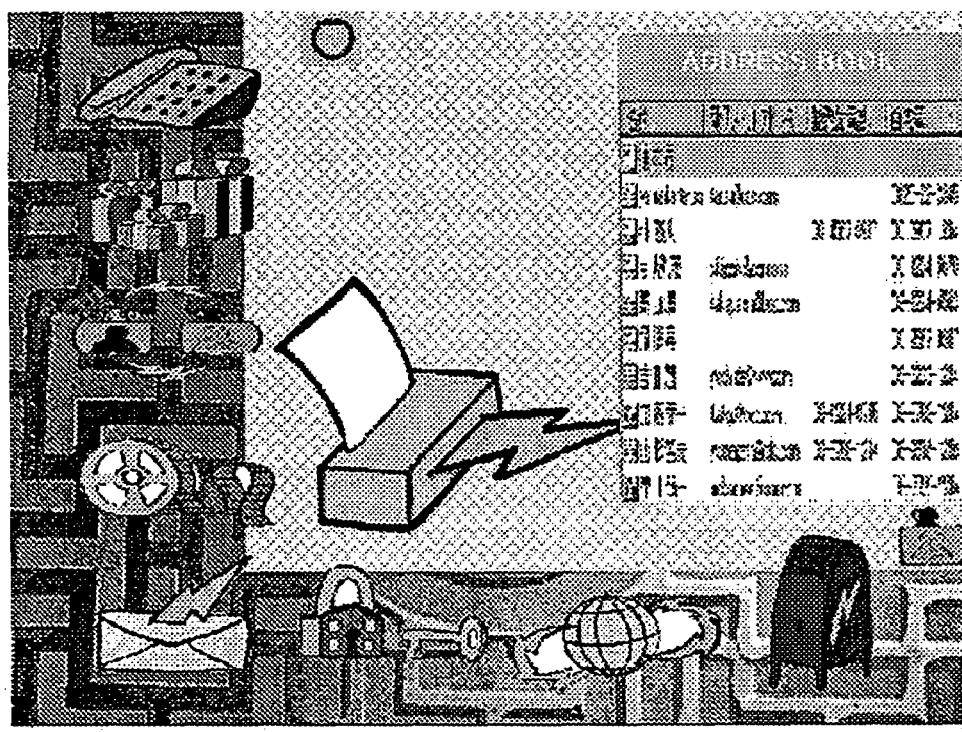
FIG. 22 is a diagram showing the display screen displaying a fax address.

On the other hand, when FAX transmission is selected, the processing routine proceeds to a STEP 4-06 and the interactive communication apparatus 1 displays a list of recipient addresses on the display screen as shown in FIG. 22.

Then in a STEP 4-07, the user selects the number to which the FAX transmission is sent from the list of addresses displayed.

As with FAX reception, the other party's line can also be specified by specifying the recipient's name from the correspondence between the recipient's name and telephone number in an address book that is registered previously, or the number may be specified directly.

Figure 23:
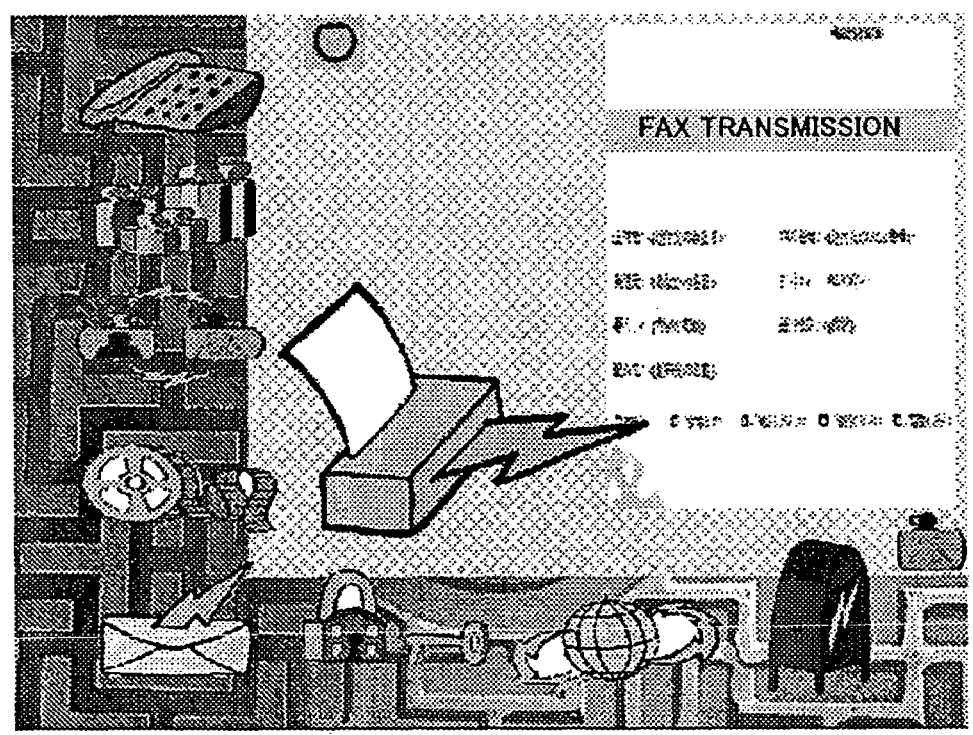
FIG. 23 is a diagram showing the display screen displaying transmission of a fax.

In a succeeding step 4-08, a document to be transmitted is acquired by the interactive communication apparatus 1 scanner as internal information and displayed on the display screen as shown in FIG. 23.

Next, in a STEP 4-09, the selected number is connected and the document transmitted.

Figure 24:
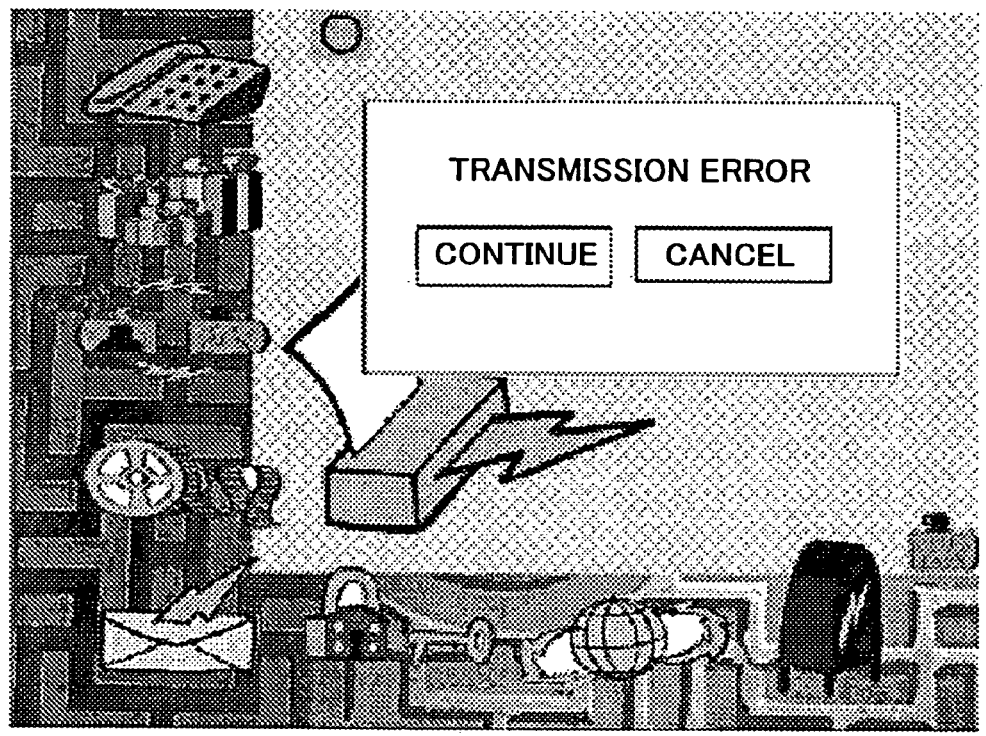
FIG. 24 is a diagram showing a transmission retry confirmation display screen.

Further, in a STEP 4-10, it is confirmed whether or not the line has been connected properly and that the document has been properly transmitted. If either the connection or the transmission has failed, the interactive communication apparatus 1 attempts a predetermined number of times to re-connect or re-transmit, after which, if the connection or transmission has still failed, the processing routine proceeds to a STEP 4-11 and displays a message indicating a transmission error as shown in FIG. 24.

In STEP 4-12, the user elects either to retry transmission or to cancel the transmission. When re-transmission is selected, the processing routine proceeds to STEP 4-09 and transmission is re-attempted. When cancellation is selected, the processing routine proceeds to STEP 1-01 in routine 1, a list of choices for selecting the functions of the interactive communication apparatus 1 is displayed on the display screen and operation of the FAX function is terminated.

If there is no malfunction concerning the connection of the number or the transmission of the document, then in a STEP 4-13 the connection to the other party's line is cut, FAX transmission is terminated and the processing routine proceeds to returns to STEP 4-01.

FIG. 8 is a flow chart showing an e-mail function processing routine.

When the e-mail function is selected from among the choices displayed on the display screen, first, in a STEP 5-01, it is confirmed whether or not operation of the e-mail function has been terminated.

Terminating the operation of the e-mail function can also be selected at any time after the e-mail function has been selected, under any and all circumstances.

When termination of the e-mail function is selected, the processing routine proceeds to STEP 1-01 in processing routine 1, a list of choices for selecting the functions of the interactive communication apparatus 1 is displayed on the display screen and the e-mail function is terminated.

When termination of the e-mail function is not selected, the processing routine proceeds sequentially to a STEP 5-02, a STEP 5-03 and a STEP 5-06, and the user selects either letter-fax, e-mail or FAX. When in STEP 5-02 the letter-fax function is selected, then the interactive communication apparatus 1 carries out the FAX transmission process of from STEP 4-06 through STEP 4-13.

Figure 25:
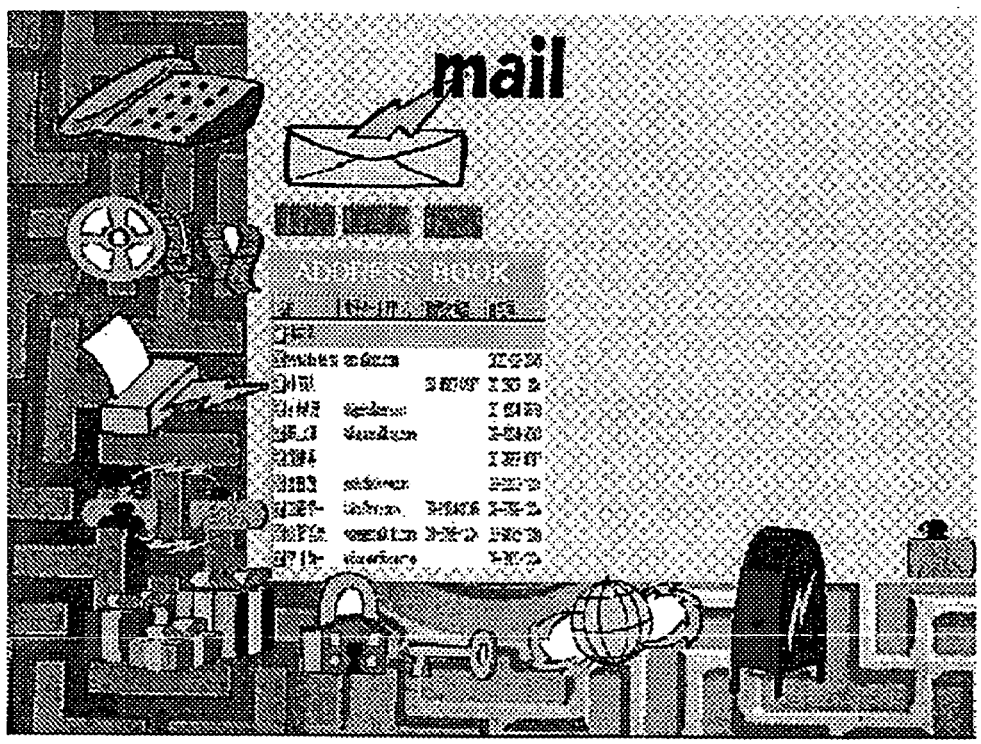
FIG. 25 is a diagram showing an e-mail display screen.

When in STEP 5-03 the e-mail function is selected, the processing routine proceeds to a STEP 5-04 and the e-mail display screen shown in FIG. 25 is displayed, thus enabling e-mail transmission, e-mail reception, e-mail transmission record display, e-mail reception record display and other typical e-mail usage.

The interactive communication apparatus 1 enables the transmission of handwritten documents by e-mail. In this case, in STEP 5-05 the hand-written document is scanned as internally captured image data by the scanner and attached to the e-mail.

When in STEP 5-06 the FAX function is selected, the processing routine proceeds to STEP 1-14 in routine 1, enabling use of the FAX pursuant to processing routine 4.

When operation is finished, the processing routine returns to STEP 5-01.

FIG. 9 is a flow chart showing an internet function processing routine 6.

When the internet function is selected from among the choices displayed on the display screen, in a STEP 6-01 it is confirmed whether or not operation of the internet function has been terminated.

Termination of the internet function can also be selected at any time, under any and all circumstances.

When termination of the internet function is selected, the processing routine returns to STEP 1-01 in routine 1, all choices are displayed on the display screen and the internet is terminated.

Figure 26:
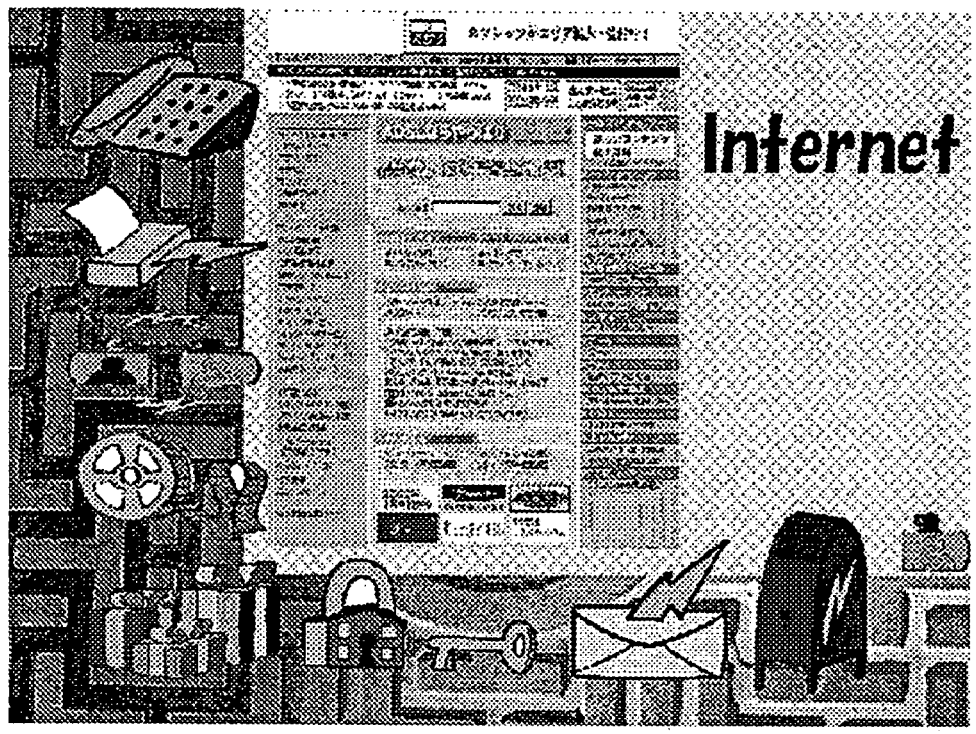
FIG. 26 is a diagram showing an internet display screen.

When in STEP 6-01 termination of the internet is not selected, the processing routine proceeds to a STEP 6-02, the interactive communication apparatus 1 connects to a predetermined internet service provider, displays as an internet display screen the display screen shown in FIG. 26 and enables ordinary usage of the internet.

When use of the internet is terminated, the processing routine returns to STEP 6-01.

FIG. 10 is a flow chart showing a home shopping function processing routine 7.

When the home shopping function is selected from among the choices displayed on the display screen, in a STEP 7-01 it is confirmed whether or not operation of the home shopping function has been terminated.

Termination of the home shopping function can also be selected at any time, under any and all circumstances.

When termination of the home shopping function is selected, the processing routine returns to STEP 1-01 in routine 1, all choices corresponding to the various functions of the interactive communication apparatus 1 are displayed on the display screen and home shopping is terminated.

Figure 27:
FIG. 27 is a diagram showing the display screen displaying a shopping menu.
Figure 28:
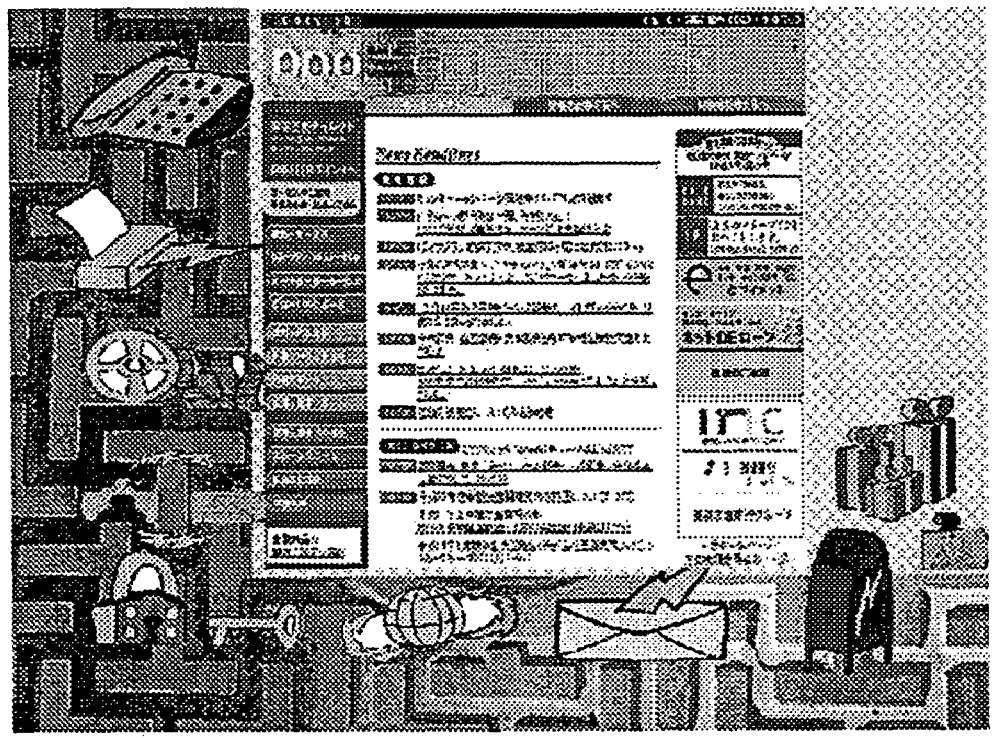
FIG. 28 is a diagram showing the display screen displaying shopping data.

When in STEP 6-01 termination of the internet is not selected, the processing routine proceeds to a STEP 7-02, the interactive communication apparatus 1 connects to a specific internet shopping site and displays on the display screen the internet shopping display screen. Then, the interactive communication apparatus 1 displays on the display screen the shopping menu of the internet shopping site shown in FIG. 27, the user can select one of options of the shopping menu on the display screen and the interactive communication apparatus 1 displays shopping data relating to the selected shopping option on the display screen as shown in FIG. 28, enabling usage of an ordinary internet shopping function.

In addition, in a STEP 7-03, on-line shopping purchases can also be paid for by credit card using the interactive communication apparatus 1 IC card reader/writer ICR1 to input credit card data and to transmit such data externally.

Further, the interactive communication apparatus 1 enables the user to speak directly with a guide of an internet shopping site through the TV phone.

In other words, when the guide displayed on the screen is selected in STEP 7-04, it is possible to speak directly with the guide using the TV phone through processing routine 2 so as to achieve optimum shopping.

When in STEP 7-04 the guide displayed on the display screen is not selected, the processing routine returns to STEP 7-01.

FIG. 11 is a flow chart showing a home security function processing routine 8.

When the home security function is selected from among the choices displayed on the display screen, in a STEP 8-01 it is confirmed whether or not operation of the home security function has been terminated.

Termination of the home security function can also be selected at any time after the home security function has been selected, under any and all circumstances.

When termination of the operation of the home security function is selected, the processing routine returns to STEP 1-01 in routine 1, all choices are displayed on the display screen and the home security function terminates.

When termination of the home security function is not selected, the processing routine proceeds to a STEP 8-02 and it is confirmed whether or not to select visitor data.

Figure 29:
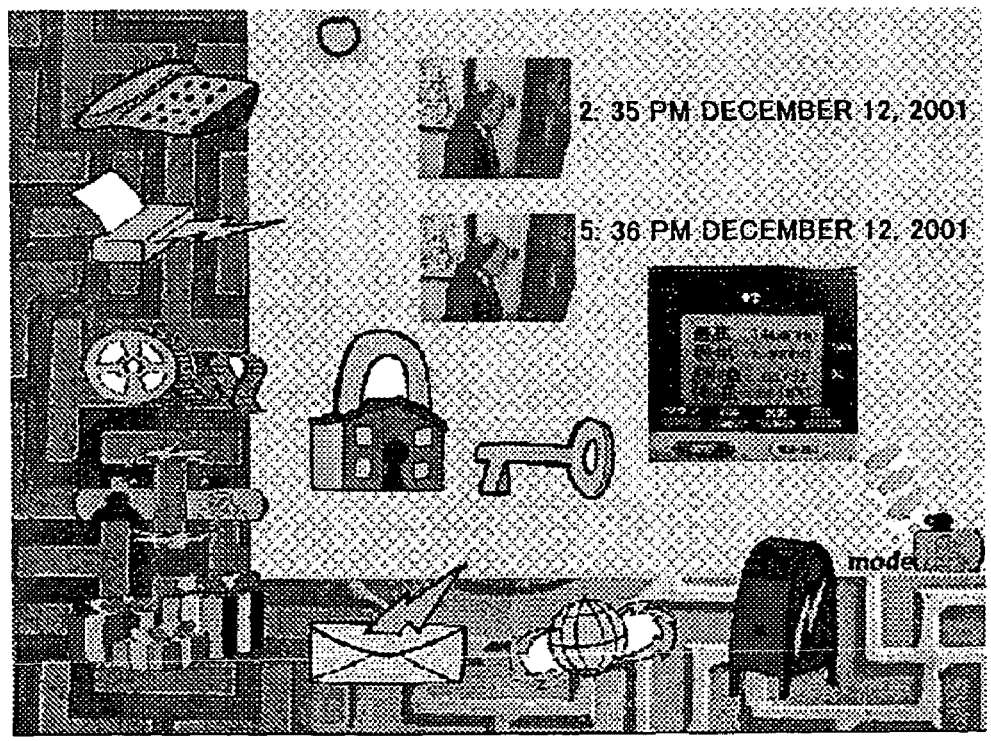
FIG. 29 is a diagram showing the display screen displaying a record of visitors.

When visitor data is selected, the processing routine proceeds to a STEP 8-03 and a record of multiple visitors (beginning with the most recent) is displayed on the display screen as shown in FIG. 29. The date and time of the visit and the internally captured image data acquired by the camera CAM2 are listed as the display of visitor record.

Next, in a STEP 8-04, the user selects data on a particular visitor from the record of visitors displayed.

It should be noted that the interactive communication apparatus 1 of the present invention may be configured so that data from medical devices such as a sphygmomanometer or a pulsometer attached to a person or an animal is displayed on the display screen together with the record of visitors, such that, when data from medical devices is selected in a STEP 8-07, the processing routine proceeds to a STEP 8-07 described later.

Figure 30:
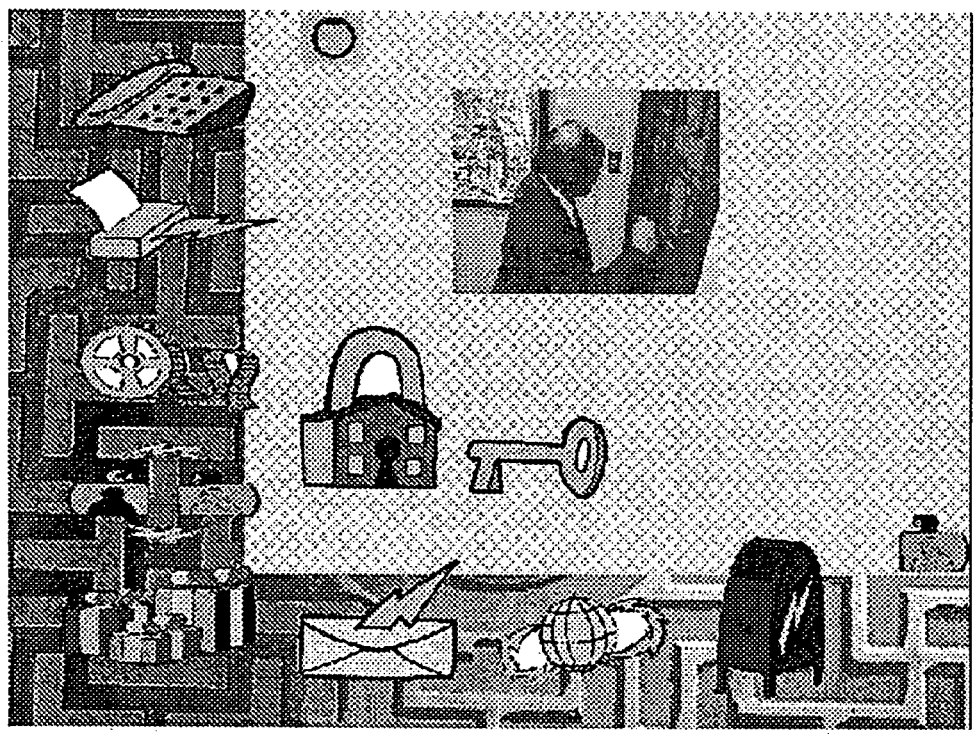
FIG. 30 is a diagram showing the display screen displaying a sensed image of a camera CAM2.

When data on a particular visitor is selected in STEP 8-04, in a STEP 8-05 the interactive communication apparatus 1 both reproduces audio data for the visitor selected in STEP 8-04 as well as reproduces and displays on the display screen internally captured image data as shown in FIG. 30, after which the processing routine returns to STEP 8-01.

When in STEP 8-04 visitor data is not selected, the processing routine returns to STEP 8-03.

When visitor data is not selected, processing proceeds to a STEP 8-06 and it is confirmed whether or not data from medical devices such as a sphygmomanometer or a pulsometer attached to a person or an animal is selected. When data from medical devices is not selected, the processing routine returns to STEP 8-01. When data from medical devices is selected, the processing routine proceeds to a STEP 8-07.

In STEP 8-07, the interactive communication apparatus 1 acquires the medical data and displays it on the display screen.

Next, in order to transmit medically related data to a medical facility and to transmit all other data to an appropriate party, STEPS 4-06 and 4-07 in processing routine 4 are carried out and a number is selected.

In a succeeding STEP 8-08, the other party's line is connected and data is transmitted, and further, it is confirmed whether or not the data has been transmitted properly by carrying out STEPS 4-10 through 4-12 of the processing routine 4.

It should be noted that internally captured image data (e.g., pictures of a patient) acquired by the camera CAM1 and internal data input using the keyboard KB1 can also be displayed on the display screen and transmitted, and thus, depending on the data, the interactive communication apparatus 1 of the present invention can also be used for more sophisticated purposes, such as caring for and monitoring the medically infirm or those living in remote areas far from medical care.

Moreover, the interactive communication apparatus 1 can be used as a TV phone at any time through processing routine 2.

It is also possible to use the TV phone together with the data transmission of STEP 8-08, in the event that the user determines that it is necessary to do so. Using the TV phone together with data transmission enables the user to speak with the other party to achieve optimum utilization.

FIG. 12 is a flow chart showing a movie distribution processing routine 9.

When the movie distribution service is selected from among the choices displayed, in a STEP-9-01 it is confirmed whether or not operation of the movie distribution service function has been terminated.

Termination of the movie distribution service function can also be selected at any time, under any and all circumstances.

When termination of the operation of the movie distribution service is selected in STEP 9-01, the processing routine returns to STEP 1-01 in routine 1, all choices are displayed on the display screen and the movie distribution service function terminates.

Figure 31:
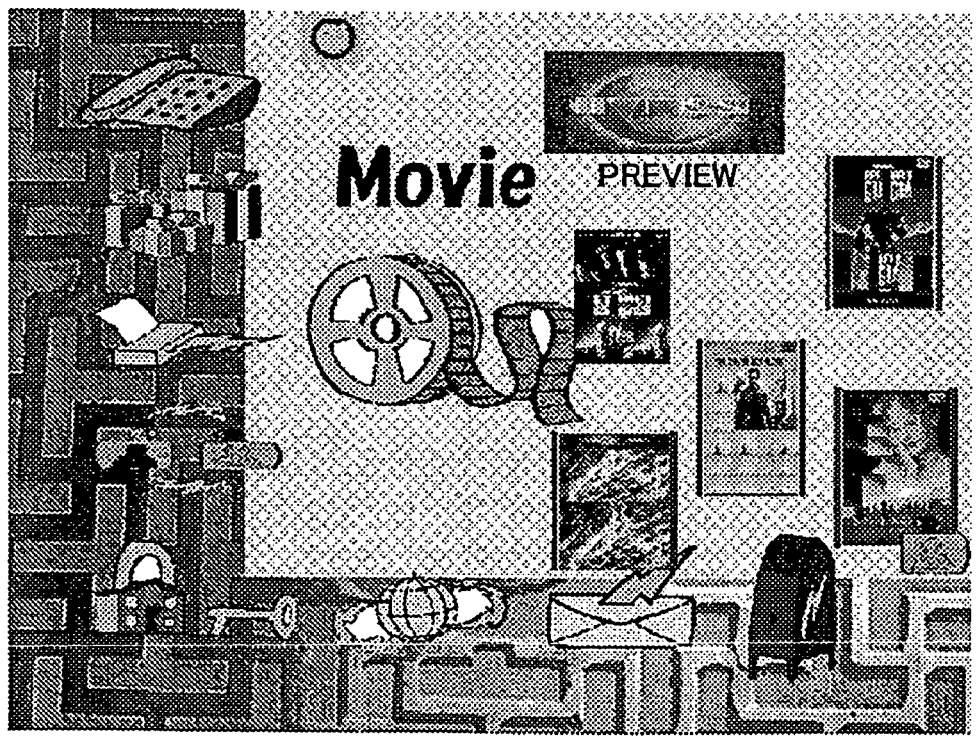
FIG. 31 is a diagram showing the display screen displaying a distribution menu.

When termination of the movie distribution service function is not selected in STEP 9-01, the processing routine proceeds to a STEP 9-02. In STEP 9-02, the interactive communication apparatus 1 connects to an internet distribution site, and in a succeeding STEP 9-03, displays a movie distribution menu as a number of choices on the display screen as shown in FIG. 31.

Figure 32:
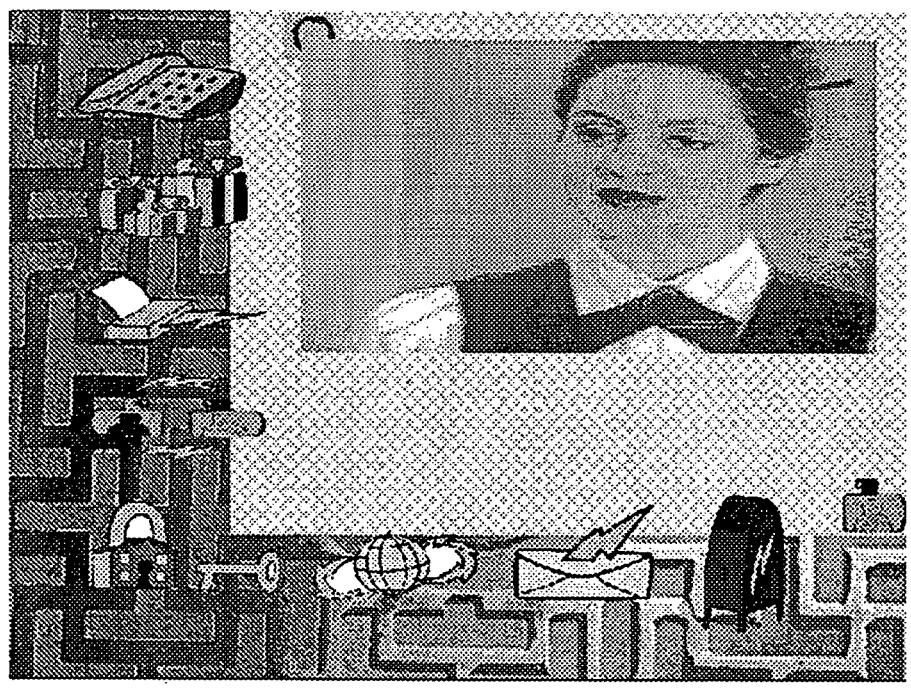
FIG. 32 is a diagram showing the display screen displaying a preview.

Next, in a STEP 9-04, the user selects an item from the distribution menu displayed on the display screen. In a STEP 9-05, the interactive communication apparatus 1 shows a preview of the selected movie, both displaying an image on the display screen as shown in FIG. 32 as well as reproducing audio through the speaker SP1. It should be noted that the preview can be conducted whether or not the movie is purchased.

When the user decides in a STEP 9-06, through previews, that a movie or the like is one that he or she wishes to view, in a STEP 9-07 the distribution fee is paid using the interactive communication apparatus 1 IC card reader/writer ICR1.

That done, in a STEP 9-08, the selected movie is distributed. The distributed movie can be viewed in real time at the interactive communication apparatus 1, and can also be stored in the interactive communication apparatus 1 and reproduced.

When in STEP 9-06 the user does not decide on a movie or the like, the processing routine returns to STEP 9-03.

The interactive communication apparatus 1 enables the user to speak directly with a guide of the distribution site using the TV phone.

By selecting the guide displayed on the screen; the processing routine 2 enables direct conversation with the guide via the TV phone to achieve optimum utilization.

FIG. 13 is a flow chart showing a postal service processing routine 10.

When "My Post Office," is selected from among the choices displayed on the display screen, first, in a STEP 10-01 it is confirmed whether or not operation of the postal service function has been terminated.

Termination of the postal service function can also be selected at any time, under any and all circumstances.

When termination of the postal service function is selected in STEP 10-01, the processing routine returns to STEP 1-01 in routine 1, all choices are displayed on the display screen and the postal service function terminates.

Figure 33:
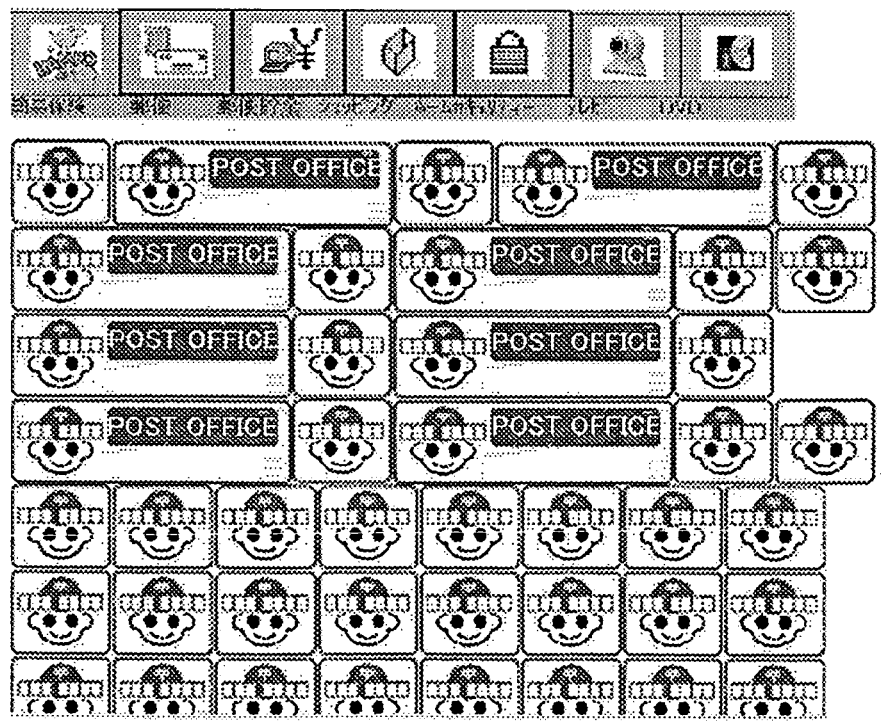
FIG. 33 is a diagram showing the display screen for a postal savings service menu.

When termination of the postal service function is not selected in STEP 10-01, the processing routine proceeds to a STEP 10-02 and a plurality of postal service options is displayed on the display screen as shown in FIG. 33.

Selecting one of the displayed postal service options enables the user to access a home page operated by the corresponding postal service division or an affiliated institution, and to utilize a variety of services offered by that postal service division or affiliated institution.

When postal system insurance is selected in STEP 10-03, in a STEP 10-04 the user can utilize services relating to the postal system insurance scheme.

The interactive communication apparatus 1 displays on the display screen data necessary to use the postal system insurance services. For example, the interactive communication apparatus 1 displays a guide of the postal system insurance as shown in FIG. 34. In addition, by selecting the option to talk with a guide from among the options displayed on the screen, the user can talk directly with a guide of the postal system insurance using the TV phone pursuant to the processing routine 2 as shown in FIG. 35.

When the post office is selected in STEP 10-05, in a STEP 10-06, the user can take advantage of post office-related services.

The interactive communication apparatus 1 displays on the display screen data necessary to use the post office-related services. For example, the interactive communication apparatus 1 displays the names of mail addresses, collection and delivery data, letter fax data and the like on the display screen as well as enables input.

Figure 36:
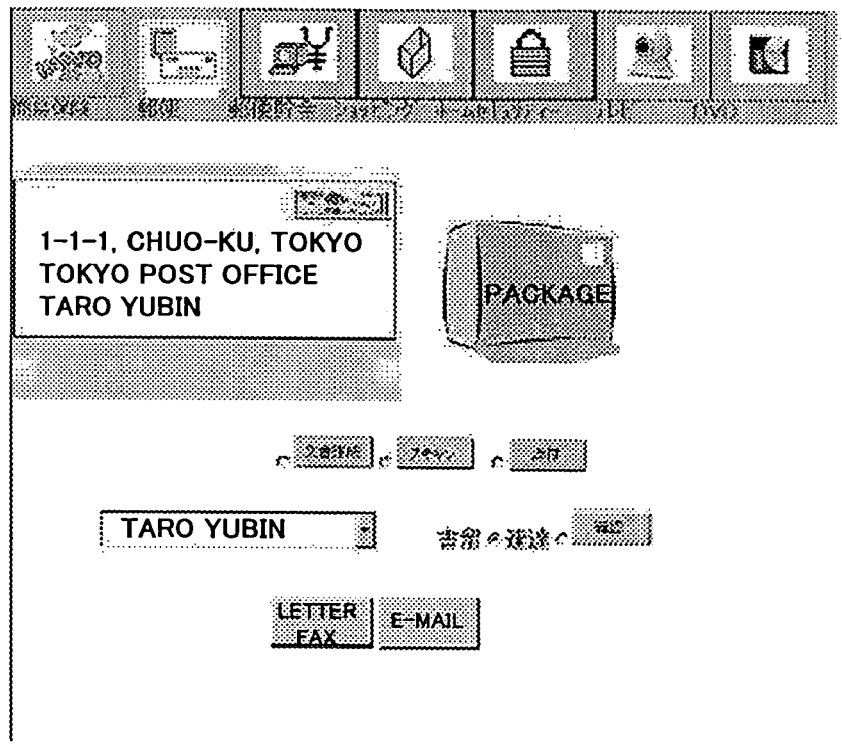
FIG. 36 is a diagram showing a postal service display screen.

FIG. 36 is a diagram showing a display screen for editing such data as the name of a package recipient, document creation, postal money order and rush delivery. From this display screen it is also possible to transmit letter faxes as well as e-mail.

When postal savings is selected in a STEP 10-07, in a STEP 10-08 the interactive communication apparatus 1 enables the user to utilize postal savings system-related services.

When utilizing postal savings system-related services, the interactive communication apparatus 1 displays account data, deposits and withdrawals, interest rate data and the like on the display screen, where the data can be edited on the screen.

Figure 37:
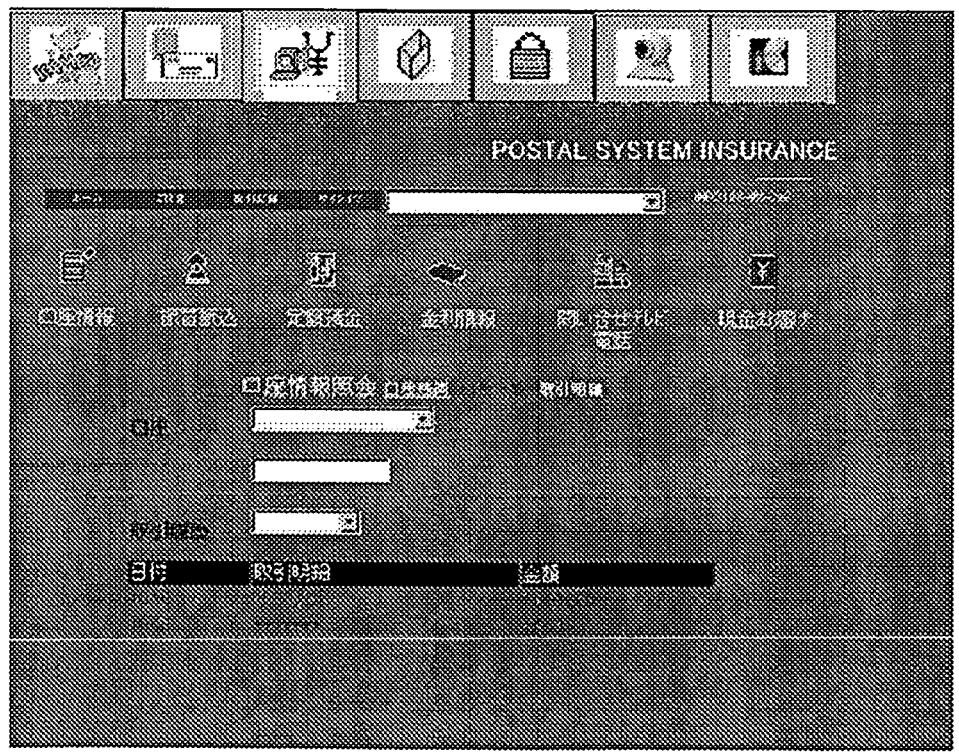
FIG. 37 is a diagram showing the display screen for a postal savings service.

FIG. 37 is a diagram showing the display screen for a postal savings service, specifically account data inquiries.

When shopping is selected in a STEP 10-09, in a STEP 10-10 the interactive communication apparatus 1 connects to a postal service or other such shopping site operated by the post office or an affiliated institution, enabling the user to carry out on-line shopping.

When home security is selected in a STEP 10-11, in a STEP 10-12 security data, data such as, for example, whether the entrance is locked or unlocked or the operating status of heaters and air conditioners, is displayed on the display screen, where the data can be edited on the screen.

When TV is selected in a STEP 10-13, in a STEP 10-14 the user can view television.

When DVD is selected in a STEP 10-15, in a STEP 10-16 the user can utilize the movie distribution service function through the processing routine 9.

In addition, when selecting options other than the postal system insurance, through the processing routine 2 the user can utilize the TV phone and can speak directly with a guide regarding using the various postal services.

In a STEP 10-17, payment of fees for the various services offered by the postal service or affiliated institutions can be accomplished using the interactive communication apparatus 1 IC card reader/writer ICR1 to input credit card data.

When using the various services offered by the post office, as shown in a STEP 10-18, the interactive communication apparatus 1 can access the post office system, including home pages operated by the post office or affiliated institutions for postal system insurance, mail, postal savings system, and so forth.

It should be noted that it is not necessary that the interactive communication apparatus 1 have all the above-described functions, and it may have different functions.

Moreover, even after one of the options among the choices listed on the display screen is selected, options pertaining to the selected option or external data can be displayed together with the selected option without deleting the selected option from display on the display screen and other options can be selected from the display screen, so that a plurality of functions can be executed simultaneously.

According to the present invention, by selecting an option displayed on the display screen, even people who know nothing at all about computers can nevertheless easily utilize such varied functions as the internet, on-line shopping and home security, without the need for complicated operations.

Moreover, when these functions are used, the ability to speak directly with the other party by audio and video enables the user to get the best data while monitoring the situation, and thus can be expected to provide drastically improved operability over a wide range of applications.

What is claimed is:

1. An interactive communication apparatus having a function of a TV phone providing a user with audio/visual information, comprising:

a display device providing a screen display of visual information;

a camera capturing images of the user to acquire internally captured image data;

a data input device allowing the user to input information;

an audio device inputting/outputting audio information from/to the user;

a communication device receiving externally captured image data and external information from outside, and transmitting the internally captured image data and internal information, including the inputted information and the audio information, outside;

a PC unit, including a CPU and a memory mounted on a mother board, connected with said display device, said camera, said data input device, said audio device and said communication device, means for displaying items of functions including the TV phone on the display screen for allowing a user to select one of the functions;

means for acquiring external information relating to the selected function through said communication device, and displaying the acquired external information on the display device;

means for displaying a plurality of options relating to the selected function as a list on the display screen for allowing the user to select one of the options;

means for shifting to the function of the TV phone when a function item of the TV phone is selected in a state of performing the selected function other than the TV phone; and means for returning the screen display to the state immediately preceding the shifting to the function of the TV phone when the function other than the TV phone is selected in performing the function of the TV phone; and a case housing said display device, said camera, said communication device and said PC unit.

2. The interactive communication apparatus according to claim 1, wherein the functions other than the TV phone comprise answering phone, facsimile, E-mail, internet access, home shopping, home security, movie distribution service, and postal service.

3. The interactive communication apparatus according to claim 2, wherein said PC unit includes means for displaying a historical record of received calls on the display device and outputting audio information of the received calls to the user when the function of answering phone is selected.

4. The interactive communication apparatus according to claim 3, wherein said PC unit includes means for displaying the record of received calls as a list for allowing the user to select one of the calls on the record of received calls and means for outputting received audio information relating to the selected one of the calls on the record of received calls.

5. The interactive communications apparatus according to claim 2, further comprising a scanner for inputting facsimile data for transmission and a printer for printing the received facsimile data,
wherein said PC unit includes means for displaying a list of received facsimiles and received facsimile data on the display device, means for printing the received facsimile data by the printer and means for transmitting inputted fax data to outside, when the function of facsimile is selected.

6. The interactive communication apparatus according to claim 5, wherein said PC unit includes means for displaying a list of received facsimiles on the display screen, means for allowing the user to select one of the facsimiles on the record of received facsimiles displayed on the display device, and means for displaying received facsimile data relating to the selected one of the record of received facsimiles on the display device.

7. The interactive communication apparatus according to claim 2, wherein said PC unit includes means for shifting the screen display to an e-mail display, means for enabling the function of the electronic mail when the item of e-mail is selected.

8. The interactive communications apparatus according to claim 2, wherein said PC unit includes means for shifting the screen display to an internet screen display and means for enabling a function of the internet when the function of internet access is selected.

9. The interactive communications apparatus according to claim 2, further comprising a card reader for reading credit card data, wherein said PC unit includes means for shifting the screen display to an internet shopping screen display, means for enabling an internet shopping function and means for transmitting the credit card data to outside through said communication device, when the function of home shopping is selected.

10. The interactive communication apparatus according to claim 2, wherein said PC unit includes means for connecting to an internet shopping site through said communication device, means for displaying a shopping menu of the internet shopping site on the display screen for allowing the user to select one of options of the displayed shopping menu, means for displaying shopping data relating to the selected option on the display device, audio communication means for audio communication with a guide of the connected internet shopping site, means for displaying an image of the guide of the connected Internet shopping site, means for switching ON/OFF the image of the guide of the internet shopping site displayed on the display device when a captured image display selection mark on the display device is selected, and means for transmitting an image of the user to the guide of the internet shopping site, when the function of home shopping is selected.

11. The interactive communication apparatus according to claim 2, further comprising an additional camera for capturing an image of a visitor, wherein said PC unit includes means for displaying captured image data of a visitor on the display device, means for outputting audio of the visitor and means for displaying a record of visitors when the item of home security is selected.

12. The interactive communication apparatus according to claim 2, further comprising means for acquiring data of a medical device attached to a person or an animal as the internal information,
wherein said PC unit includes means for displaying the acquired data on the display device, means for transmitting the internal data to a particular medical facility, means for displaying externally captured image data from the medical facility on the display device, means for enabling audio communication with the medical facility, and means for transmitting the internally captured image data to the medical facility, when the function of home security is selected.

13. The interactive communication apparatus according to claim 2, wherein said PC unit includes means for displaying a movie distribution menu on the display device for allowing the user to select one of options of the distribution menu, means for displaying video and outputting audio of a movie relating to the selected option on the display device, audio communication means for enabling audio communication with a guide of the distribution site, means for displaying an image of the guide of the distribution site on the display device, and means for transmitting an image of the user to the guide of the distribution site, when the function of movie distribution service is selected.

14. The interactive communication apparatus according to claim 2, wherein said PC unit includes means for displaying a postal service guide on the display device for allowing the user to select one of postal services of the postal service menu, means for displaying data relating to the selected postal service on the display device, means for enabling audio communication with a guide of the selected service, means for displaying an image of the guide of the service on the display device, and means for transmitting an image of the user to the guide of the service, when the function of postal service is selected.

15. The interactive communication apparatus according to claim 1, wherein said PC unit includes means for displaying the externally captured image data on said display device, means for enabling audio communications through said audio device and said communication device, and means for transmitting the internally captured image data to outside through said communication means, when the function of TV phone is selected.

16. The interactive communication apparatus according to claim 1, wherein said PC unit includes means for turning off the screen display of the externally captured image data and returning the screen display to a state immediately preceding the shift to the function of TV phone, and means for continuing the audio communications though said audio device and said communication device, when a captured image display selection mark displayed on the display device is selected.

17. The interactive communication apparatus according to claim 16, wherein said PC unit includes means for displaying the internally captured image data on the display screen when the captured image display selection mark is selected.

18. The interactive communication apparatus according to claim 1, wherein the internally captured image data are acquired by removing a cap covering the camera.

19. The interactive communication apparatus according to claim 1, wherein said PC unit is removably housed in said case.

* * * * *

UNITED STATES PATENT AND TRADEMARK OFFICE
CERTIFICATE OF CORRECTION

PATENT NO. : 7,425,977 B2 Page 1 of 1
APPLICATION NO. : 10/914204
DATED : September 16, 2008
INVENTOR(S) : Yakichiro Sakai It is certified that error appears in the above-identified patent and that said Letters Patent is hereby corrected as shown below:

Title Page, Column 1 (Assignee), Line 1, after "(JP)" insert --;-- and at Line 2, insert --Chen Tzujen, Taipei (TW)--.

Column 18, Line 55, change "though" to --through--.

Signed and Sealed this

Sixth Day of January, 2009

JON W. DUDAS
*Director of the United States Patent and Trademark Office*